United States Patent
Brown et al.

(10) Patent No.: US 10,392,007 B1
(45) Date of Patent: *Aug. 27, 2019

(54) STABILITY CONTROL SYSTEM

(71) Applicant: Hydro-Gear Limited Partnership, Sullivan, IL (US)

(72) Inventors: Alyn G. Brown, Indianapolis, IN (US); Anthony Joseph Lapp, Houston, TX (US)

(73) Assignee: Hydro-Gear Limited Partnership, Sullivan, IL (US)

(*) Notice: Subject to any disclaimer, the term of this patent is extended or adjusted under 35 U.S.C. 154(b) by 76 days.

This patent is subject to a terminal disclaimer.

(21) Appl. No.: 15/707,869

(22) Filed: Sep. 18, 2017

Related U.S. Application Data

(63) Continuation-in-part of application No. 15/082,425, filed on Mar. 28, 2016, now Pat. No. 9,764,734.
(Continued)

(51) Int. Cl.
*G05D 1/08* (2006.01)
*B60L 15/20* (2006.01)
(Continued)

(52) U.S. Cl.
CPC ......... *B60W 30/04* (2013.01); *B60L 15/2036* (2013.01); *B60W 30/025* (2013.01);
(Continued)

(58) Field of Classification Search
CPC .. B60L 11/123; B60L 15/2036; B62D 11/003; B62D 11/04; B62D 11/12; G05D 1/0891; B60W 30/025; G01C 21/18
(Continued)

(56) References Cited

U.S. PATENT DOCUMENTS 5,197,008 A 3/1993 Itoh et al.
5,563,786 A 10/1996 Torii
(Continued)

FOREIGN PATENT DOCUMENTS

EP 2888930 7/2015

OTHER PUBLICATIONS

Grewal, et al., "Global Positioning Systems, Inertial Navigation, and Integration," A John Wiley & Sons, Inc. Publication, ISBN 0-471-35032-X, 2001.
(Continued)

*Primary Examiner* — Maceeh Anwari
(74) *Attorney, Agent, or Firm* — Neal, Gerber & Eisenberg LLP

(57) ABSTRACT

A drive and control system is provided for use on a zero turn vehicle, and includes first and second hydraulic ground drives independently driving a pair of driven wheels. Each ground drive has an electric actuator to control the output thereof. An operator mechanism generates a drive signal corresponding to a neutral drive position or to one of a plurality of non-neutral drive positions of the operator mechanism, and a steering signal corresponding to a neutral steering position or to one of a plurality of non-neutral steering positions of the operator mechanism. Sensors generate signals corresponding to sensed roll, pitch and yaw parameters. A stability control module includes a processor for receiving the drive and steering signals and for providing output signals to the electric actuators.

22 Claims, 13 Drawing Sheets

Related U.S. Application Data

(60) Provisional application No. 62/138,872, filed on Mar. 26, 2015.

(51) Int. Cl.
    *B60W 30/02* (2012.01)
    *B60W 30/04* (2006.01)
    *B62D 11/00* (2006.01)
    *B62D 11/12* (2006.01)
    *G01C 21/18* (2006.01)

(52) U.S. Cl.
    CPC ............ *B62D 11/003* (2013.01); *B62D 11/12* (2013.01); *G01C 21/18* (2013.01); *G05D 1/0891* (2013.01); *G05D 2201/0208* (2013.01)

(58) Field of Classification Search
    USPC .................................................... 701/22, 41
    See application file for complete search history.

(56) References Cited

U.S. PATENT DOCUMENTS

| | | | |
|---|---|---|---|
| 5,906,645 A | 5/1999 | Kagawa et al. |
| 6,052,647 A | 4/2000 | Parkinson et al. |
| 6,775,976 B1 | 8/2004 | Phanco et al. |
| 7,134,276 B1 | 11/2006 | Langenfeld et al. |
| 7,499,775 B2 | 3/2009 | Filippov et al. |
| 7,590,481 B2 | 9/2009 | Lu et al. |
| 8,078,338 B2 | 12/2011 | Pack et al. |
| 8,275,516 B2 | 9/2012 | Murphy |
| 8,483,911 B2 | 7/2013 | Reich |
| 8,490,722 B2 | 7/2013 | Koga et al. |
| 8,532,864 B2 | 9/2013 | Sato et al. |
| 8,712,639 B2 | 4/2014 | Lu et al. |
| 8,838,311 B2 | 9/2014 | Koike et al. |
| 8,950,520 B2 | 2/2015 | Hauser et al. |
| 9,114,798 B1 | 8/2015 | Fox et al. |
| 9,266,532 B2 | 2/2016 | Meissner et al. |
| 9,380,742 B2 | 7/2016 | Biber et al. |
| 9,656,687 B2 | 5/2017 | Koike et al. |
| 9,725,114 B1 | 8/2017 | Brown et al. |
| 2009/0192674 A1 | 7/2009 | Simons |
| 2014/0371975 A1 | 12/2014 | Biber et al. |

OTHER PUBLICATIONS

Mandapat, "Development and Evaluation of Positioning Systems for Autonomous Vehicle Navigation," A thesis presented to the graduate school of the University of Florida, 2001.

"Methodological approach to assess tractor stability in normal operation in field using a commercial warning device," Journal of Agricultural Engineering 2013, vol. XLIV (52):e132.

Bendix EC-60 ABS/ATC/ESP Controllers Service Data, BW2429, Bendix Commerical Vehicle Systems LLC, May 2005.

Electronic Stability Control Manual, Freescale Semiconductor, Inc., STABCTRLFS Rev. 5, 2012.

Inertial Technology for North Finding Brochure, Silicon Sensing Systems, Ltd., Dec. 2013.

U.S. Appl. No. 15/377,706, filed Dec. 13, 2016.

U.S. Appl. No. 15/640,300, filed Jun. 30, 2017.

U.S. Appl. No. 62/543,030, filed Aug. 9, 2017.

Wabco Electronic Stability Control (ESC) Informational Sheet, Obtained from website <http://www.wabco-auto.com> on Feb. 19, 2015.

STABILITY CONTROL SYSTEM

CROSS-REFERENCE

This application is a continuation-in-part of U.S. patent application Ser. No. 15/082,425, filed on Mar. 28, 2016, which claims the benefit of U.S. Provisional Patent App. No. 62/138,872, filed Mar. 26, 2015. The terms of these prior applications are incorporated by reference herein in their entirety.

BACKGROUND OF THE INVENTION

This invention relates to a system and method of providing stability control to a driven vehicle, and in particular a utility vehicle having electrically-controlled right and left-side ground drives to provide propulsion and steering, such as a zero turn mower, a skid-steer loader or similar utility vehicle. The vehicle may include a standard steering wheel and pedal control system, or it may be controlled by a pair of control sticks or a joystick linked to electronic controls.

SUMMARY OF THE INVENTION

The system disclosed herein provides stability control and related features and benefits, including straight line tracking, wheel slip and traction control, hillside stability and hill slope operation limits. These features are important for use in such vehicles used on uneven terrain and on slopes. The present system has advantages on hillsides, for example, where straight line tracking can be accomplished without the additional complexity associated with front wheel steering mechanisms for zero turn vehicles, such as those illustrated in U.S. Pat. No. 8,950,520 or without the burden of an operator differentially steering the vehicle across the hillside.

The benefits and features of the system disclosed herein are accomplished using a multi-axis gyroscope, a multi-axis accelerometer, a multi-axis magnetometer, input from the vehicle accelerator and input from the vehicle steering system. Various components can be replaced with an inertial measurement unit ("IMU") to provide detailed information regarding the spatial relationship of the vehicle with its environment. The present design provides the features disclosed herein without the need for wheel speed sensors, thereby reducing the cost and complexity of the design.

In an embodiment disclosed herein, lap bars (a.k.a. control levers or control sticks) are used to control the direction and speed of a zero turn vehicle, such as a lawn mower, having independently controlled left and right transaxles separately driving left and right drive wheels. The lap bars are attached to the transaxles by means of electronic connection instead of the typical mechanical linkages or cables. Upon initial set up, a vehicle having such control members is tuned to have similar output from the separate transaxles given similar placement of the two lap bars. More specifically, if the lap bars are both at the same displacement from neutral, then the system determines that the operator wishes to have similar output from the transaxles, resulting in straight line travel by the vehicle. When the control system is informed, by means of a gyroscope, that the vehicle is traversing a hillside on a path parallel to or across the slope (i.e., not up or down the hill) the stability control system of one embodiment disclosed herein can come into operation. The difference in displacement between the two lap bars may be referred to as the "spread" between them. If the system detects that both lap bars are within a set distance from one another (which may be, e.g., within 1 or 2 degrees of each other) then the system can assume that the operator desires straight line travel. Gravity will cause the front of the vehicle to veer downhill, thus affecting the ability to continue in a straight line. The stability control system can detect when this occurs and cause a steering correction to be made. This anti-dive system can be programmed to operate immediately upon detection of veering of the front of the vehicle, effectively causing a course correction quicker than an operator of the vehicle could make a similar course correction.

Alternatively, a vehicle in accordance with the disclosures herein may use an activation pedal or switch to engage or disengage the stability control system.

When the stability control system so described is operative, the operator may wish to turn the vehicle, and thus move one of both of the lap bars such that they are no longer within the selected distance from one another (the 1 or 2 degrees mentioned above). In such a case, the sudden disconnection of the stability control system may cause the operator to experience "jerkiness" or other unpleasant ride sensation. To avoid such issues, the system disclosed herein performs a graduated discontinuance of the stability override.

In another embodiment, a similar operation can be conducted on flat ground, where for example imperfections in the turf may cause the front of the vehicle to veer from the intended course.

In another embodiment, a vehicle in accordance with the teachings herein may include steered front casters connected to and controlled by a central processor. In conjunction with ground drive control during a hillside traverse tracking mode, the front casters can be pivoted slightly in the uphill direction to assist in maintaining travel of the vehicle in a straight line.

A vehicle in such an embodiment may comprise a prime mover, first and second driven rear wheels, and first and second steered front wheels, a first ground drive powering the first driven rear wheel and a second ground drive powering the second driven rear wheel, wherein the first ground drive and the second ground drive are powered by the prime mover; a stability control module disposed on the vehicle and comprising a processor and an inertial measurement unit; and a steering mechanism connected to the stability control module to provide a steering input thereto. The vehicle may also comprise a vehicle or operator input device connected to the stability control module to provide a speed input to the stability control module; a first electric actuator disposed on the first hydrostatic ground drive and in communication with the stability control module to provide input to the first ground drive; a second electric actuator disposed on the second hydrostatic ground drive and in communication with the stability control module to provide input to the second ground drive; a first steered front wheel having a first steering actuator engaged to the stability control module, and a second steered front wheel having a second steering actuator, wherein the first and second steering actuators are engaged to the stability control module and wherein, when the vehicle is on a slope exceeding a predetermined angle, the stability control module is programmed to provide a steering force signal to both the first and second steering actuators to steer the front wheels to counteract the effect of the slope. The first and second ground drives may each comprise a separate hydrostatic transmission. The vehicle may further comprise a mower deck engaged to and powered by the prime mover. The vehicle may comprise a first axle speed sensor connected to the stability control module and providing a first speed signal indicative of the output speed of the first ground drive, and a second axle speed sensor connected to the stability control module and providing a second speed signal indicative of the output speed of the second ground drive. The steering mechanism may comprise a steering wheel or a pair of lap bars or a joystick.

A better understanding of the invention will be obtained from the following detailed descriptions and accompanying drawings, which set forth illustrative embodiments indicative of the various ways in which the principles of the invention may be employed.

DETAILED DESCRIPTION OF THE DRAWINGS

Figure 1:
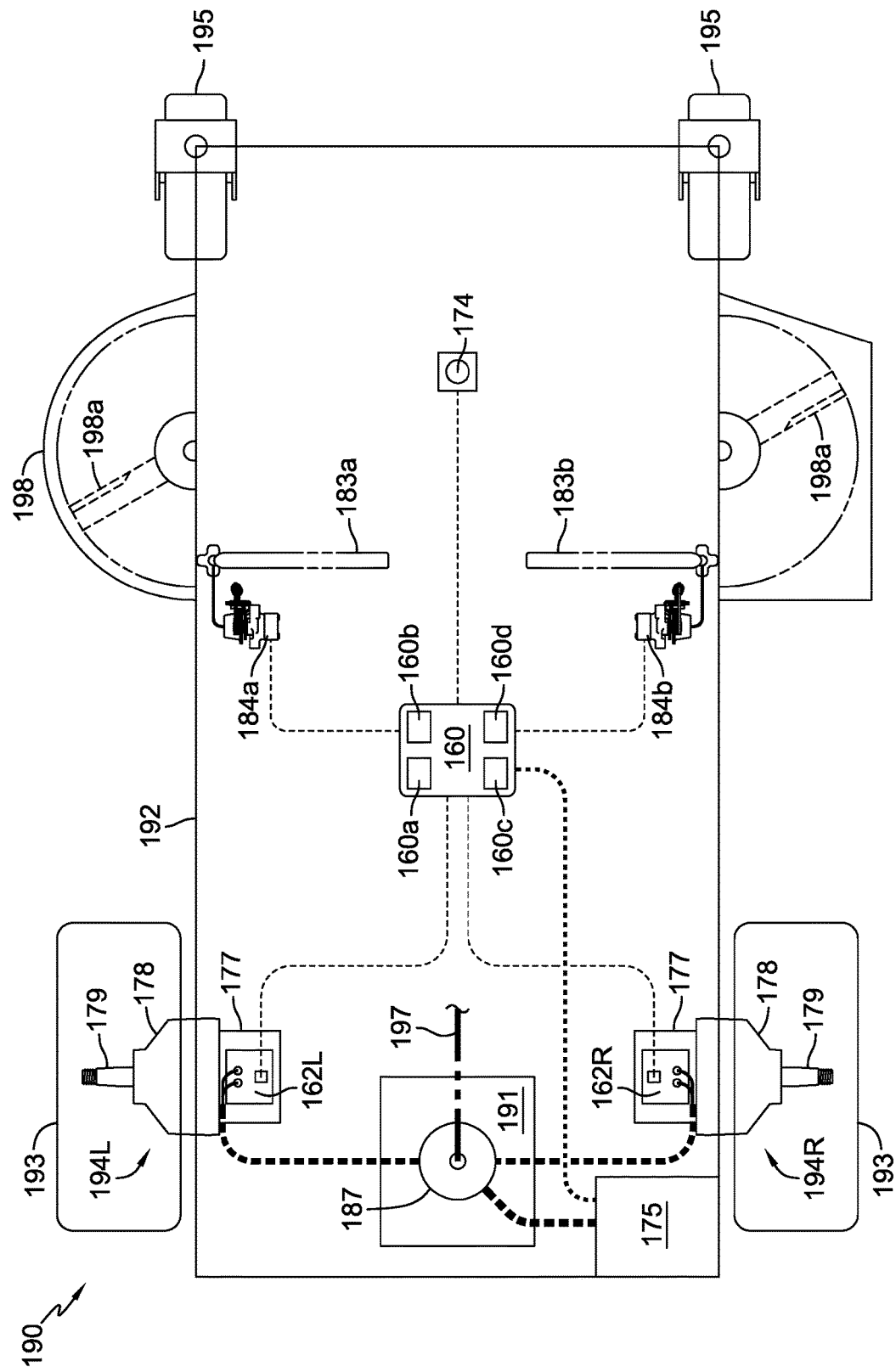
FIG. 1 is a schematic view of a vehicle using control sticks and incorporating a stability control system in accordance with the present disclosure.

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. For example, the internal combustion engines 191, 291 depicted in FIGS. 1 and 2, respectively, may be presumed to function in substantially the same manner unless otherwise stated herein. Additionally, the drawings set forth herein are schematic and not necessarily drawn to scale, and in some instances proportions may have been exaggerated to more clearly depict certain features. As stated above, this specification is intended to be taken as a whole and interpreted in accordance with the principles of the invention as taught herein and understood by one of ordinary skill in the art.

FIG. 1 depicts a first zero turn vehicle 190 incorporating an embodiment of the stability control system. Vehicle 190 is a hybrid powered vehicle having a frame 192 on which is mounted an internal combustion engine 191 turning a generator 187 that provides electrical energy to a left-side ground drive 194L and a right-side ground drive 194R. Internal combustion engine 191 further drives a mowing deck 198 having a plurality of mowing blades 198a by means of a belt and pulley system 197 in a known manner, such as by selective engagement with a manual or electric clutch pulley (not shown).

Each of the ground drives has an electric motor 177, a gear reduction 178, and an output axle 179 engaged to a drive wheel 193 to provide propulsion and steering. Vehicle 190 also has a pair of non-driven, non-steered caster wheels 195 supporting its frame 192 that freely pivot and track in response to the steering impetus provided by the drive wheels 193. Each ground drive 194L, 194R has a motor controller 162L, 162R respectively, that apportions current from generator 187 to its electric motor 177 in response to control signals from a processor 160c in stability control module 160. The control signals are generated, in part, in response to the control inputs initiated by an operator manipulating left and right-side control sticks 183a, 183b engaged to a pair of accelerator devices, such as the potentiometers or position sensors 184a, 184b respectively, depicted in FIG. 1. Movement of a control stick in a forward direction produces forward rotation of the output axle 179 and drive wheel 193 of the corresponding left or right-side ground drive 194L, 194R, whereas movement of a control stick in a reverse direction produces reverse rotation of the respective output axle 179 and drive wheel 193. The degree to which the control sticks are rotated forward or back produces a proportionate, scalable output from the ground drives 194L, 194R. In between forward and reverse lies a scalable deadband akin to a neutral position. It is this independent control of the left and right-side drive wheels that produces the considerable maneuverability for which zero turn vehicles are known. The interaction of operator inputs as translated and modified by the processor of stability control module 160 in response to sensed conditions will be detailed further below. A warning indicator 174 may be included to provide the operator with necessary signals as needed. Generator 187 further provides energy to a battery 175 that provides electrical energy for stability control module 160 and the various signal-generating sensors and output devices completing the drive and stability control systems of vehicle 190. Generator 187 may include a controller to regulate electrical system voltages at battery 175, which serves as an energy buffer to the output of generator 187 at peak system loads.

Figure 2:
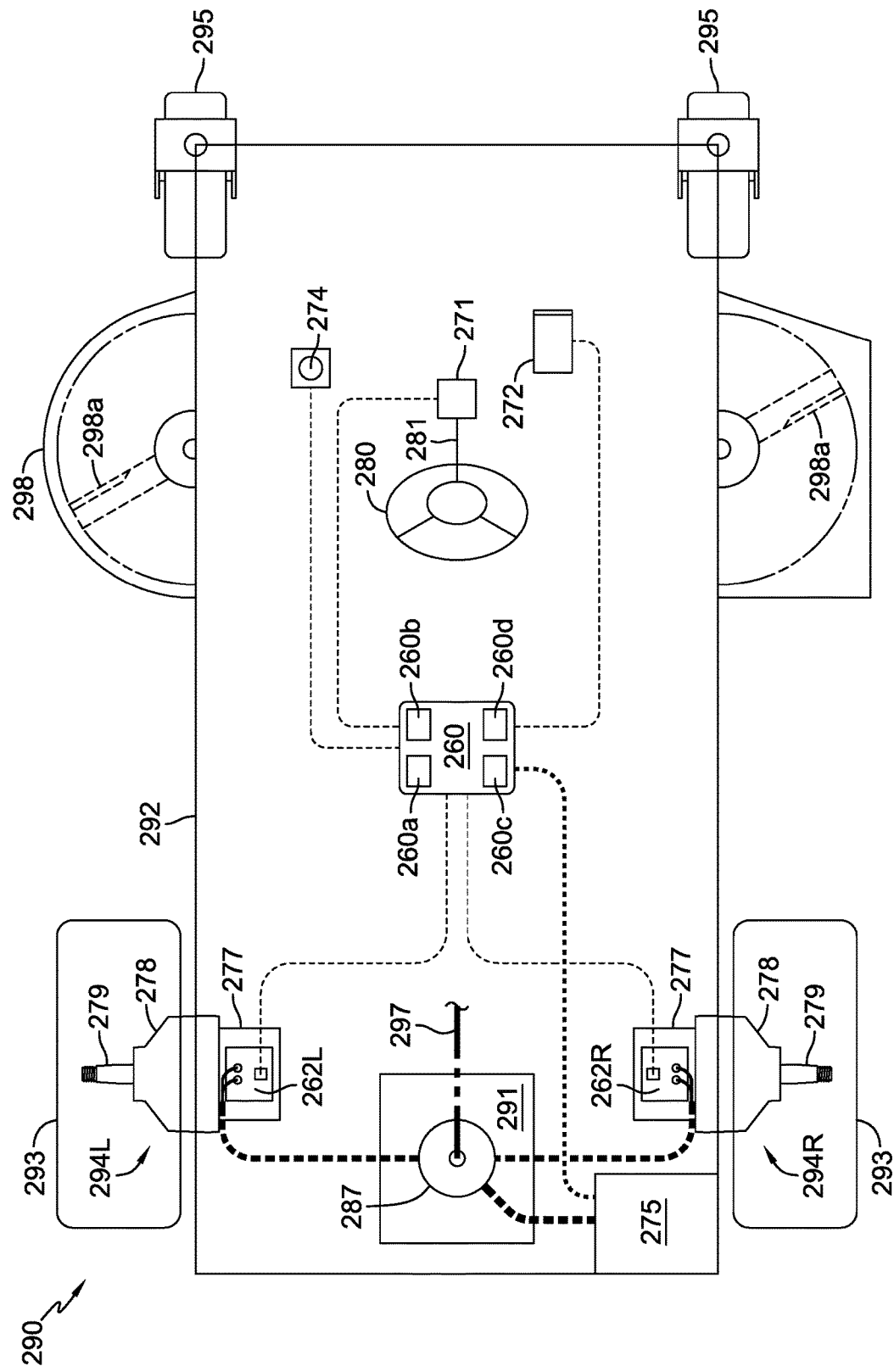
FIG. 2 is a schematic view of a vehicle using conventional steering wheel and pedal controls and incorporating a stability control system in accordance with the present disclosure.

FIG. 2 depicts a second zero turn vehicle 290 substantially similar in form and function to vehicle 190, except for the operator control devices. In this instance, the steering input device consists of a steering wheel 280 that rotates a steering shaft 281 whose rotational position is communicated to the processor of stability control module 260, and ultimately the motor controllers 262L, 262R of ground drives 294L, 294R respectively, by a signal generated by potentiometer or position sensor 271. Speed and direction commands are initiated by a signal from a rocker-style accelerator pedal 272 engaged to a potentiometer or position sensor (not depicted) in a known manner. Though depicted as a single pedal 272, speed and direction inputs can be obtained from separate forward and reverse pedals (not shown). The remaining components of vehicle 290 are substantially similar in form and function to those previously described for vehicle 190 and will not be further detailed herein. The vehicles depicted herein are exemplary and it is contemplated that the stability control system disclosed herein can be used with other vehicles in accordance with its teachings.

Figure 10:
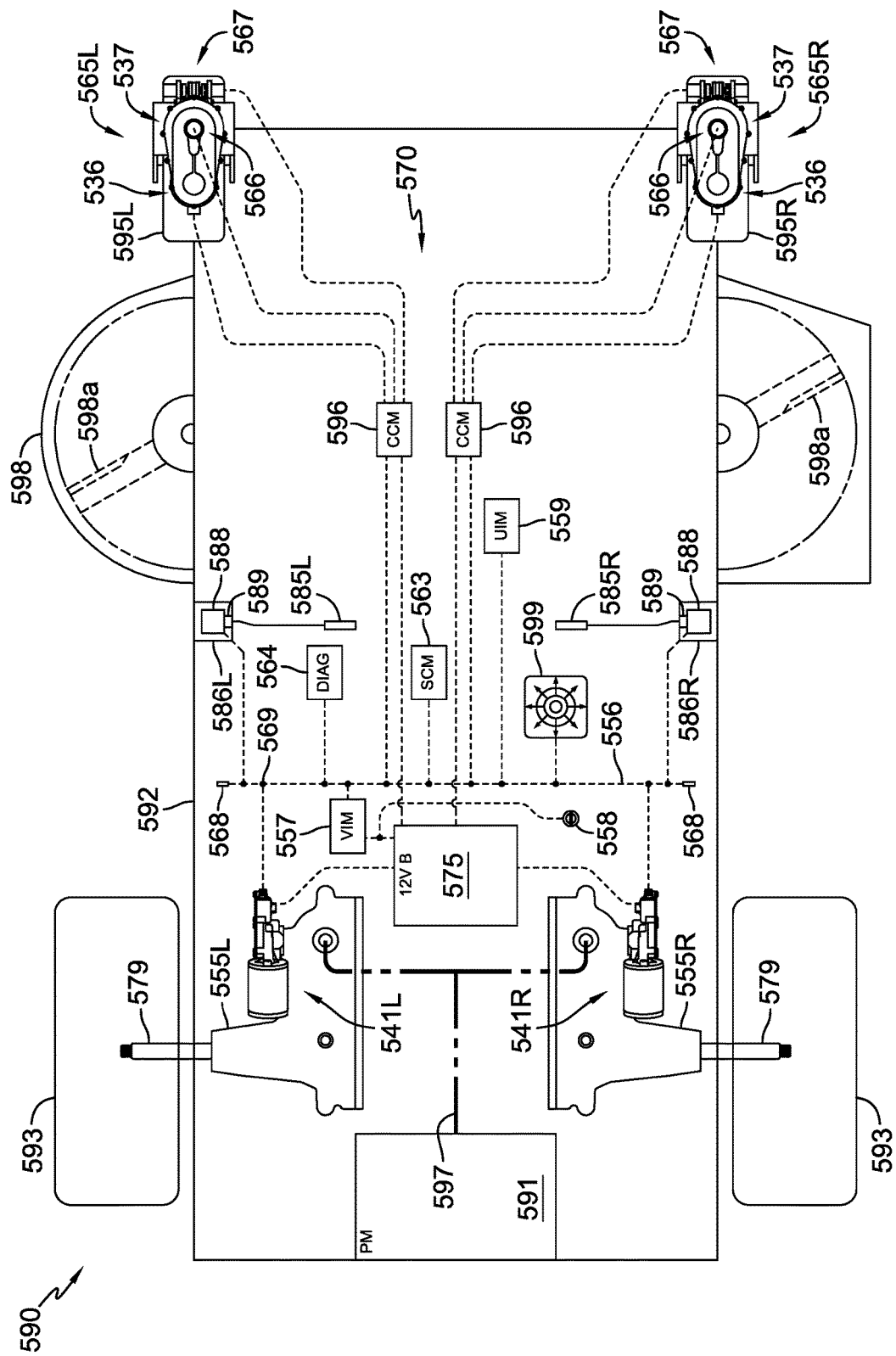
FIG. 10 is a schematic view of a vehicle using control sticks and incorporating a stability control system in accordance with a CAN-based embodiment of the present disclosure and including steered front casters.
Figure 11:
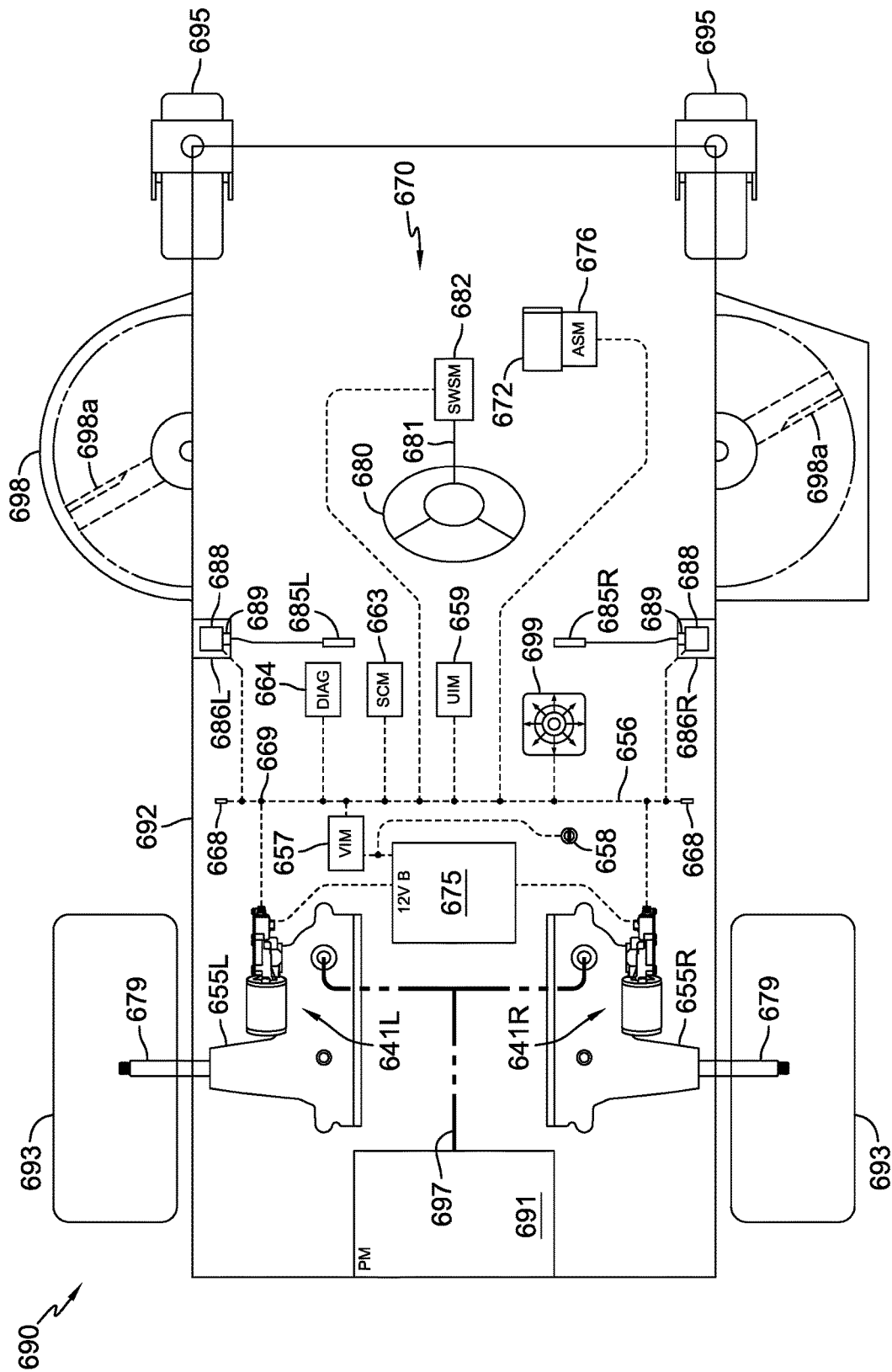
FIG. 11 is a schematic view of a vehicle similar to that shown in FIG. 10 but without steered front casters and including an optional steering wheel system.

Stability control module 160 contains a multi-axis gyroscope 160a for understanding the orientation of the vehicle 190 in space, a multi-axis accelerometer 160b for understanding movement of the vehicle along those axes, a processor 160c and a storage device 160d. Stability control module 260 in FIG. 2 can be of similar construction to stability control module 160, and it will be understood that the descriptions of stability control module 160 and vehicle 190 will similarly apply to stability control module 260 and vehicle 290, except as noted. It will also be understood that gyroscope 160a, 260a, accelerometer 160b, 260b, processor 160c, 260c and storage device 160d, 260d may be of standard design programmed in accordance with the disclosure herein and form a part of the respective stability control modules 160, 260. It will also be understood that certain components such as gyroscope 160a, 260a, and accelerometer 160b, 260b could be mounted on vehicles 190, 290 separate from stability control modules 160, 260, and these components need not be in the same housing or structure. It will be further understood that features such as the gyroscope 160a, 260a, accelerometer 160b, 260b, and the like may be replaced with an inertial measurement unit such as IMU 361a in stability control module 361 as shown in FIG. 8 or IMU 461a in stability control module 461 in the vehicle of FIG. 9, as discussed in more detail below, or by a stability control module 563 or 663 as shown in FIGS. 10 and 11, respectively.

The processor 160c of stability control module 160 receives inputs (from the operator input devices previously described) indicative of desired speed and directional outputs for each of the ground drives 194L and 194R. A zero turn vehicle, such as vehicle 190, differentially steers by varying the rotational speed and direction of the drive wheels 193. In the event that the rotational speed and direction of the drive wheels 193 are substantially identical, vehicle 190 will track along a straight path on level ground. While the inputs from the individual control sticks 183a, 183b of vehicle 190 and their respective potentiometers or position sensors 184a, 184b have a direct correspondence to the desired outputs of the individual ground drives 194L, 194R, the inputs from steering wheel 280 and accelerator pedal 272, and their respective potentiometers or position sensors 271, must be evaluated by the processor of stability control module 260 in a more complex fashion to discern the desired outputs for individual ground drives 294L, 294R.

The processor 160c of stability control module 160 further receives inputs from multi-axis gyroscope 160a and multi-axis accelerometer 160b to adjust and modify the command signals sent to the motor controllers 162L, 162R in response to environmental effects on the vehicle 190 such as surface conditions (which can produce wheel slip), ground slope, and the like. The current allocated to each electric motor 177 determines both the speed and rotational direction of the output axles 179. Because this current varies with environmental load factors to produce a target vehicle speed and direction, and the multi-axis gyroscope 160a and multi-axis accelerometer 160b can provide the processor with feedback as to deviation from the target vehicle speed and direction, a vehicle equipped with the stability control system described herein can accomplish enhanced straight line tracking, wheel slip and traction control, hillside stability and rollover protection.

Figure 8:
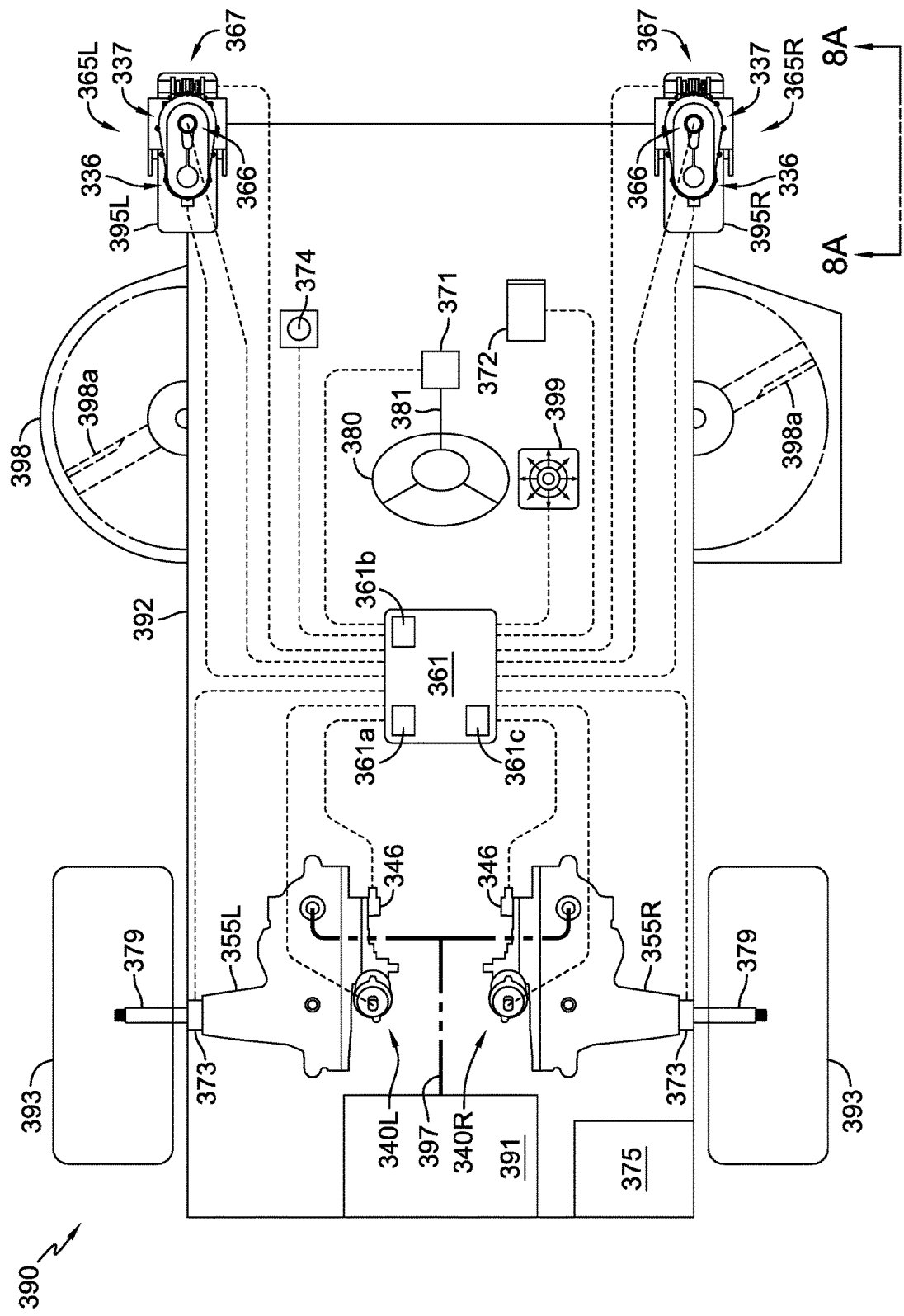
FIG. 8 is a schematic view of a vehicle using conventional steering wheel and pedal controls and incorporating a stability control system in accordance with the present disclosure, similar in some respects to the vehicle shown in FIG. 2, but also including steered front casters.

FIGS. 8, 9, 10 and 11 depict various vehicles incorporating different embodiments of the stability control system disclosed herein. These embodiments use many similar components, and serial numbering is used to indicate such similarities therein. It will be understood that the wiring in the figures herein is shown schematically for convenience. Turning first to FIG. 8, vehicle 390 has a frame 392 on which is mounted an internal combustion engine 391 driving a belt and pulley system 397 to power ground drive assemblies, in this embodiment a pair of hydrostatic zero turn transaxles 355L, 355R. Each of the zero turn transaxles 355L, 355R may be similar internally to the drive apparatus shown and described in commonly owned U.S. Pat. Nos. 6,775,976 and 7,134,276, the terms of which are incorporated herein by reference.

Internal combustion engine 391 further drives a mowing deck 398 having mowing blade(s) 398a by means of belt and pulley system 397 in a known manner, such as by selective engagement with a manual or electric clutch pulley (not shown).

Each of the zero turn transaxles 355L, 355R has a respective electric actuator assembly 340L, 340R, which may be similar to the actuators shown and described in commonly-owned U.S. Pat. No. 9,114,798, the terms of which are incorporated herein by reference. A position sensor 346 is also mounted on each actuator 340L, 340R. Axle speed sensors 373, when needed, may be mounted adjacent to output axles 379. Various embodiments of this disclosure show different types of actuators to control the output of the driven drive units such as transaxles 355L, 355R and other transaxles shown in, e.g., FIGS. 9, 10, and 11. It will be understood that other types of actuators could be used in the spirit of this disclosure, including linear actuators, servos, electronically-controlled valves and the like for changing the output of the transaxle at issue.

A stability control module 361 is disposed on vehicle 390 and may include components such as IMU 361a, processor 361b and storage device 361c. Stability control module 361 is connected to a variety of components on the vehicle 390, including position sensors 346 and axle speed sensors 373 to receive feedback from the drives, and to actuators 340L, 340R in order to control the output and speed of transaxles 355L, 355R in response to inputs. The steering input device consists of a steering wheel 380 that rotates a steering shaft 381 whose rotational position is communicated to the processor of stability control module 361 by a signal generated by potentiometer or position sensor 371. Speed and direction commands are initiated by a signal from a rocker-style accelerator pedal 372 engaged to a potentiometer or position sensor (not depicted) in a known manner The interaction of operator inputs as translated and modified by the processor of stability control module 361 in response to sensed conditions will be detailed further below.

Vehicle 390 includes an optional joystick 399 wired to stability control module 361 for control of the vehicle in lieu of steering wheel and accelerator pedal controls. Joystick 399 may be similar to that disclosed in commonly owned U.S. Pat. No. 9,725,114, the terms of which are incorporated herein by reference, and may be used if needed or desired as an optional control device of vehicle 390, or may replace the steering wheel and accelerator pedal controls altogether. As before, a warning indicator 374 may also be included to provide the operator with necessary signals as needed. Battery 375 is used to provide electrical energy for stability control module 361 and the various signal-generating sensors and output devices on vehicle 390. It will be understood that the use of the term control lever is intended to be synonymous with control stick.

Figure 8A:
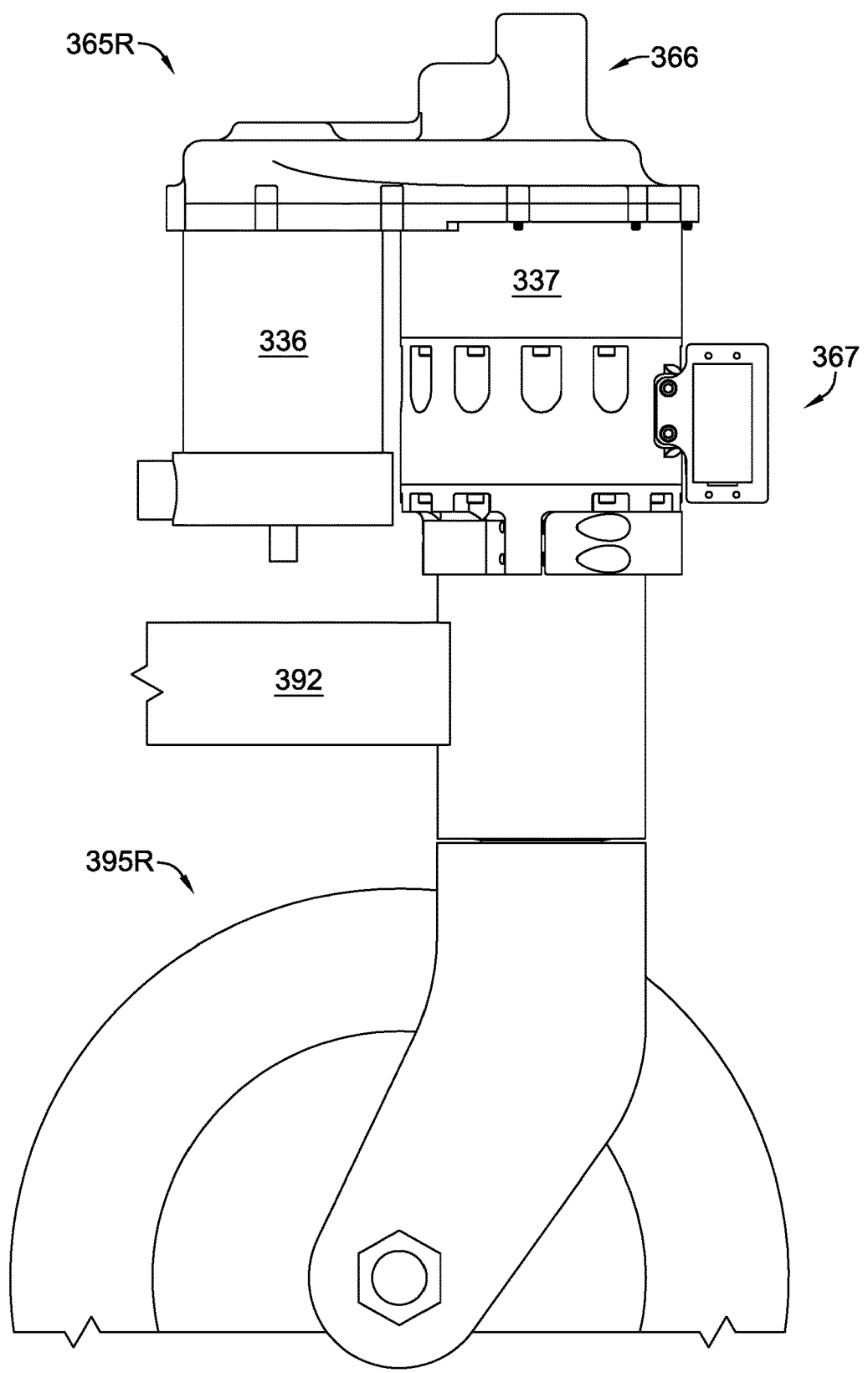
FIG. 8A is a side elevational view of a steered caster as shown in FIG. 8, along the lines 8A-8A.

Vehicle 390 also has a pair of steered caster wheels 395L, 395R disposed at the front of frame 392. An exemplary steered caster 395R is shown in FIG. 8A. Each steered caster 395R, 395L includes an electric actuator assembly 365L, 365R comprising an electric motor 336 that can be driven in forward or reverse, and a speed reduction mechanism 337. In the illustrated embodiment, each speed reduction mechanism 337 is belt-driven by one of the electric motors 336 and speed reduction mechanism 337 comprises a cycloidal drive, a planetary gear set, or other speed reducing mechanism. Actuator assemblies 365L, 365R are wired to and controlled by processor 361b and respond to steering signals generated by processor 361b in response to, e.g., steering input direction as calculated from steering wheel 380 or joystick 399 (in embodiments using such inputs), and processor 361b calculates the intended turn ratio and drives front casters 395L, 395R to the optimum angle to achieve the desired turn. Clutch mechanisms 367 are used to engage/disengage steering of caster wheels 395L, 395R, as determined by the vehicle control system or the vehicle operator, and a position sensor 366 located in line with the pivot axis of each caster wheel 395L, 395R provides feedback to processor 361b to determine the rotational position of each caster wheel 395L, 395R. The illustrated clutch mechanisms 367 each comprise a pair of rotary servo motors that pivot a yoke to move a clutch dog component in and out of engagement to prevent or allow pivoting of caster wheels 395L, 395R. It should be noted that a single servo motor could be used to pivot each yoke.

Figure 9:
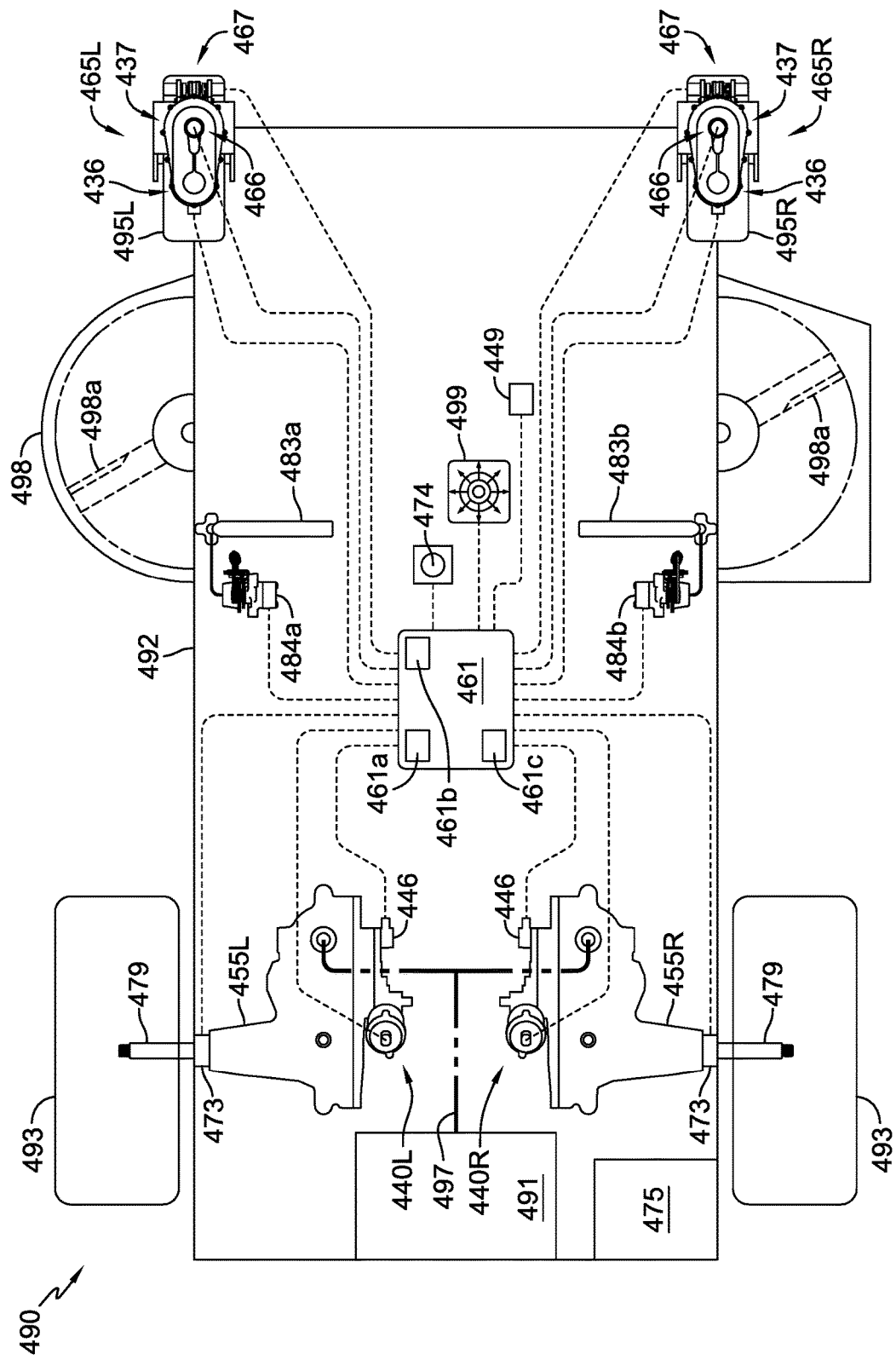
FIG. 9 is a schematic view of a vehicle using control sticks and incorporating a stability control system in accordance with the present disclosure, similar in some respects to the vehicle shown in FIG. 1, but also including steered front casters.

FIG. 9 depicts another zero turn vehicle 490 in accordance with the disclosure herein. Vehicle 490 has a frame 492 on which is mounted an internal combustion engine 491 driving a belt and pulley system 497 to power ground drive assemblies, in this embodiment a pair of hydrostatic zero turn transaxles 455L, 455R. Each of the zero turn transaxles 455L, 455R may be similar internally to the transaxles 355L, 355R. Internal combustion engine 491 further drives a mowing deck 498 having mowing blade(s) 498a by means of belt and pulley system 497 in a known manner, such as by selective engagement with a manual or electric clutch pulley (not shown).

Each transaxle 455L, 455R has a respective electric actuator assembly 440L, 440R, which may be similar to actuators 340L, 340R. A position sensor 446 is also mounted on each actuator 440L, 440R. Axle speed sensors 473, when needed, may be mounted adjacent to output axles 479.

A stability control module 461 is disposed on vehicle 490 and may include IMU 461a, processor 461b and storage device 461c. Stability control module 461 is connected to a variety of components on the vehicle 490, including position sensors 446 and axle speed sensors 473 to receive feedback from the drives, and to actuators 440L, 440R in order to control the output and speed of transaxles 455L, 455R in response to inputs. Control signals are generated, in part, in response to the control inputs initiated by an operator manipulating left and right-side control levers 483a, 483b engaged to a pair of accelerator devices, such as the potentiometers or position sensors 484a, 484b respectively, which are connected to processor 461b. It will be understood that the wiring in the figures herein is shown schematically for convenience. Movement of a control lever 483a or 483b in a forward direction produces forward rotation of the output axle 479 and drive wheel 493 of the corresponding left or right-side transaxle 455L, 455R, whereas movement of the control lever in a reverse direction produces reverse rotation of the respective output axle 479 and drive wheel 493. The interaction of operator inputs as translated and modified by the processor of stability control module 461 in response to sensed conditions will be detailed further below.

Vehicle 490 includes an optional joystick 499 wired to stability control module 461 for control of the vehicle in lieu of using control levers 483a, 483b. Joystick 499 may be similar to joystick 399 described above, and may be used if needed or desired as an optional control device of vehicle 490, or may replace control levers 483a, 483b altogether. As before, a warning indicator 474 may also be included to provide the operator with necessary signals as needed. Battery 475 is used to provide electrical energy for stability control module 461 and the various signal-generating sensors and output devices completing the drive and stability control systems of vehicle 490.

Vehicle 490 also has a pair of steered caster wheels 495L, 495R disposed at the front of frame 492, and actuator assemblies 465L, 465R comprising an electric motor 436 and a speed reduction mechanism 437. Steered caster wheels 495L, 495R are controlled by corresponding electric actuator assemblies 465L, 465R, which are similar to actuator assemblies 365L, 365R. Actuator assemblies 465L, 465R are wired to and controlled by processor 461b and respond to steering signals generated by processor 461b as described above. Clutch mechanisms 467 are used to engage/disengage steering of caster wheels 495L, 495R, as determined by the vehicle control system or the vehicle operator, and a position sensor 466 provides feedback to processor 461b to determine the rotational position of each caster wheel 495L, 495R. A caster steering engagement/disengagement switch (or pedal switch) 449 may be provided to allow operator control or override of the steered casters clutch function.

The steered casters 395L, 395R and 495L, 495R shown in FIGS. 8, 8A and 9 offer additional stability control benefits. The description provided herein will discuss these benefits with regard to vehicle 390 but it will be understood that these benefits also apply to vehicle 490 and other vehicle embodiments incorporating these features. Casters 395L, 395R are preferably controlled using servo style positioning. Casters that are pointing straight forward and in the direction of forward travel are considered to be at 180 degrees. A turn of a caster 395L, 395R in the clockwise direction is considered to be going towards 360 degrees, whereas a turn in the counterclockwise direction is considered to be going towards zero degrees. IMU 361a provides vehicle 390 motion and attitude data that is used by processor 361b to calculate a proper angle or angular adjustment for each caster 395L, 395R based on kinematics and vehicle attitude. (Kinematic equations are used to describe constant velocity motion and constant acceleration motion using variables of displacement, acceleration, velocity and time, as is known in the art.)

When vehicle 390 is traversing a hillside having a certain slope, the front casters 395L, 395R can be pivoted slightly in the uphill direction to assist in maintaining travel of vehicle 390 in a straight line. By way of example, it has been determined that in the case of a vehicle traversing a hill of approximately seven (7) degrees slope, where the vehicle is driving generally perpendicular to the direction of the slope at a speed of six (6) mph, pivoting the casters approximately two (2) degrees in the uphill direction will assist in maintaining straight line vehicle travel without need of further correction from the operator.

As noted above, stability control module 361 preferably comprises IMU 361a, processor 361b and storage device 361c. IMU 361a provides data to processor 361b pertaining to the orientation of the vehicle 390 in space and to the movement of the vehicle in relation to x, y and z spatial axes. Stability control module 461 in FIG. 9 can be of similar construction to stability control module 361, and it will be understood that the descriptions of stability control module 361 and vehicle 390 will similarly apply to stability control module 461 and vehicle 490, except as noted. It will also be understood that IMU 361a, 461a, processor 361b, 461b and storage device 361c, 461c may be of standard design programmed in accordance with the disclosure herein and form a part of the respective stability control modules 361, 461. It will also be understood that certain components such as IMU 361a, 461a could be separately mounted on vehicles 390, 490.

The processor 361b of stability control module 361 receives inputs from the operator input devices previously described indicative of desired speed and directional outputs for each of the ground drives 355L and 355R. Vehicle 390 differentially steers by varying the rotational speed and direction of the drive wheels 393. In the event that the rotational speed and direction of the drive wheels 393 are substantially identical, vehicle 390 will track along a straight path. While the inputs from the individual control levers 483a, 483b of vehicle 490 and their respective potentiometers or position sensors 484a, 484b have a direct correspondence to the desired outputs of the individual ground drives 455L, 455R in the FIG. 9 embodiment, the inputs from steering wheel 380 and accelerator pedal 372, and their respective potentiometers or position sensors 371 in the FIG. 8 embodiment must be evaluated by the processor of stability control module 361 in a more complex fashion to discern the desired outputs for individual ground drives 355L, 355R.

Processor 361b further receives inputs from IMU 361a that are used to adjust and modify the command signals sent to actuators 340L, 340R in response to environmental effects on the vehicle 390 such as surface conditions (which can produce wheel slip), ground slope, and the like. If IMU 361a detects a significant and sudden change in the orientation of the vehicle within certain parameters that are consistent with the vehicle suddenly traversing a hillside or other steep slope, the system can be programmed to modify vehicle speed to maintain a safe speed.

Additional vehicles 590 and 690 are disclosed in FIGS. 10 and 11, and the control systems of these vehicles differ from the prior embodiments in several respects. In particular, vehicles 590 and 690 use a CAN Bus system with a Vehicle Integration Module ("VIM") similar to that shown and described in commonly owned U.S. patent application Ser. No. 15/640,300, the disclosure of which is incorporated herein by reference in its entirety, and which is now U.S. Pat. No. 10,058,031.

Turning to FIG. 10 first, zero turn vehicle 590 includes an internal combustion engine 591 driving a belt and pulley system 597 to power a pair of ground drive assemblies, namely hydrostatic zero turn transaxles 555L, 555R. Each of the zero turn transaxles 555L, 555R may be similar internally to transaxles 355L, 355R and others described herein, and each drives an output axle 579 engaged to a driven wheel 593. Internal combustion engine 591 further drives a mowing deck 598 having mowing blade(s) 598a, as discussed before.

Each of the zero turn transaxles 555L, 555R has a respective electric, high-speed actuator assembly 541L, 541R, which may be similar to that shown in commonly owned U.S. Pat. App. Ser. No. 62/543,030, the disclosure of which is incorporated herein by reference in its entirety. As noted before, other types of actuators could be used in place of these high-speed actuators in accordance with the teachings herein.

Vehicle 590 includes a control system 570 comprising a plurality of components connected to a CAN Bus network 556 through a plurality of CAN Bus T-connectors 569. As will be understood, CAN Bus terminations 568 are also incorporated. Battery 575 is used to provide electrical energy for CAN Bus network 556, VIM 557 and related components of vehicle 590. The VIM 557 is directly wired to CAN Bus network 556 and key switch 558 to permit the user to engage and operate the control system. User interface module 559 (which may include a graphical user interface, a display screen, a touch screen, or any other user interface to receive user input and/or to display or communicate system function, status, or other data to the user) and diagnostic module 564 are connected to CAN Bus network 556 and used to provide information and feedback to the user for operation and control of vehicle 590. Stability control module 563 (which may comprise an IMU module) is also connected to CAN Bus network 556 to provide proper stability control to vehicle 590.

A pair of speed control mechanisms 586L, 586R are disposed on vehicle 590 and connected to CAN Bus network 556. Control signals to CAN Bus network 556 are generated, in part, in response to the control inputs initiated by an operator manipulating left and right-side control levers 585L, 585R, each engaged to one of a pair of speed and direction controllers 588 including neutral switches 589. Speed and direction controllers 588 (a.k.a. lap bar sensor modules) may be similar to those in commonly owned U.S. patent application Ser. No. 15/377,706, the terms of which are incorporated herein by reference in their entirety.

As with the other embodiments, it will be understood that the wiring in the figures herein is shown schematically for convenience. Movement of a control lever 585L or 585R in a forward direction produces forward rotation of the output axle 579 and driven wheel 593 of the corresponding left or right-side transaxle 555L, 555R, whereas movement of the control lever in a reverse direction produces reverse rotation of the respective output axle 579 and drive wheel 593. The interaction of operator inputs as translated and modified by the processor of stability control module 563 in response to sensed conditions will be detailed further below.

Vehicle 590 includes an optional joystick 599 wired to CAN Bus network 556 for control of the vehicle in lieu of using control levers 585L, 585R. Joystick 599 may be similar to the joysticks described above, and may be used if needed or desired as an optional control device of vehicle 590, or may replace control levers 585L, 585R altogether.

Vehicle 590 also has a pair of steered caster wheels 595L, 595R disposed at the front of frame 592, and actuator assemblies 565L, 565R comprising an electric motor 536 and a speed reduction mechanism 537. Steered caster wheels 595L, 595R are controlled by corresponding electric actuator assemblies 565L, 565R, and these caster assemblies may be similar to those shown and described in FIGS. 8 and 8A. Actuator assemblies 565L, 565R are wired to and controlled by caster control modules 596, which are in turn wired to CAN Bus network 556 to receive and respond to steering signals generated by speed and direction controllers 588 and/or by stability control module 563 as may be needed or appropriate. Clutch mechanisms 567 are used to engage/disengage the steered caster wheels 595L, 595R, as determined by the vehicle control system or the vehicle operator, and position sensors 566 provide feedback to caster control modules 596 to determine the rotational position of each steered caster wheel 595L, 595R.

Like stability control modules 160, 260, 361, and 461, stability control module 563 may be configured to provide stability control and related features and benefits, including straight line tracking, wheel slip and traction control, hillside stability and rollover protection. Stability control module 563 may comprise an Inertial Measurement Unit (IMU) module. The IMU module may be configured to include a multi-axis IMU, a microprocessor, power filtering and conversion, temperature sensor, and a CAN interface for communicating data over CAN Bus 556. The multi-axis IMU may include a multi-axis accelerometer, a multi-axis gyroscope, and/or a multi-axis magnetometer. In this way, the IMU module may be capable of motion processing, including multi-axis accelerometer processing, multi-axis gyroscope processing, and multi-axis magnetometer processing for traction and stability control of the vehicle, and particularly, to ensure the vehicle maintains a straight track on level ground as well as maintaining a straight track while traversing a side slope. The IMU module may also include an attitude and heading reference system for yaw, pitch, and roll control of the vehicle. To do this, the IMU module, via one or more algorithms, may fuse the output from each of the multi-axis accelerometer, the multi-axis gyroscope, and the multi-axis magnetometer to obtain a vector in one or more dimensions. In other embodiments, the output of each of the multi-axis accelerometer, the multi-axis gyroscope, and the multi-axis magnetometer may be utilized separately. Regardless of the form or type of data output from the IMU module, the output may be placed onto the CAN Bus and be received and utilized by another device, such as by VIM 557, which may itself be configured to perform motion processing for stability control. From the user's standpoint, the one or more algorithms may be configured to provide real-time, dynamic, and effortless control of the vehicle when the vehicle is operating on a hill, for example.

In some embodiments, the multi-axis accelerometer, the multi-axis gyroscope, and the multi-axis magnetometer begin operating when the vehicle is turned "on." An on/off switch (not shown) may be used to activate the one or more algorithms to utilize the output from the multi-axis accelerometer, the multi-axis gyroscope, and the multi-axis magnetometer to automatically adjust vehicle response, such as vehicle yaw and vehicle speed. The one or more algorithms may dynamically adjust vehicle drive control input signals to result in a user experience of effortless control of the vehicle. The one or more algorithms may be user-selected or predetermined.

The multi-axis IMU may be isolation mounted in a housing to minimize noise and data loss. The IMU module may itself be isolation mounted to the vehicle via a mechanical, vibration and shock damping mount system. For example, a visco-elastic material such as Sorbothane®, which is available from Sorbothane, Inc., may be used to isolate the IMU module from vibration during use of the vehicle. Stability control module 563 and the IMU module may be electrically powered via CAN Bus 556 as described herein.

In one embodiment, a Motion Processing Unit (MPU) of the IMU module is configured to receive data from the multi-axis gyroscope and the multi-axis accelerometer of the multi-axis IMU. The MPU may be configured to fuse the data based on Digital Motion Processor (DMP) settings and produce quaternions. The data will be placed on the CAN-Bus on a first-in, first out (FIFO) basis along with data from the multi-axis magnetometer as well as any other selected data. An interrupt pin may be asserted so the microprocessor will know data is ready. The microprocessor interrupt service routine may be configured to read the FIFO data and load the data into a Motion Processing Library (MPL). The microprocessor can now query the MPL for quaternions, Euler angles, heading, etc. The microprocessor may be configured to generate appropriate messages based on the module configuration settings and place the messages on CAN bus 556.

In some embodiments, the data available from the IMU module may include:
  Module system status
  IMU calibration status
  IMU self-test status
  IMU Temperature ° C.
  Quaternion (w, x, y, z)
  Yaw, Pitch, Roll degrees
  Heading degrees
  Heading (fused) degrees
  Accelerometer (x, y, z) g
  Gyroscope (x, y, z) (°/s)
  Magnetometer (x, y, z)
  Magnetometer strength uT
  Accumulated Gyroscope (x, y, z) degrees
  Accelerometer tilt x to z degrees
  Accelerometer tilt y to z degrees
  Accelerometer tilt x to y degrees Vehicle control system 570 may include multiple IMU modules, (including an IMU module described above) of one or more configurations. Each IMU module may be capable of parameter tuning or adjustment over CAN Bus 556 via a plug-in interface or via remote programming device. Tunable parameters may be defined by user access level so that only a user with the specified access level may modify the value of the parameter.

VIM 557 may include a microprocessor, non-volatile memory, one or more data input ports, and a CAN Bus interface. VIM 557 may be configured to enable one or more display modules or devices to be plugged into one or more ports of the VIM 557 to enable a user to interface with the VIM 557. VIM 557 may be configured to receive commands, such as module status signals, and process those signals within 5 ms of reception. VIM 557 may be configured to transmit data, such as system safety data, or retransmit data, such as operator inputs, such that the transmitted or retransmitted data is not more than 5 ms old at the time of transmission. VIM 557 may include a Bluetooth Module for external communications with a remote device, such as a portable communications device or a web server.

As also discussed below, VIM 557 may be capable of interpreting and making decisions based on (1) vehicle safety status received from one or more vehicle safety devices, (2) vehicle movement signals received from one or more input devices manipulated by the user, and (3) vehicle position, roll, pitch, yaw and motion data from the IMU of the stability control module 563, among others.

VIM 557 may be configured to receive analog and digital input signals including system safety interlock data and vehicle module statuses to ensure safe operation before allowing vehicle motion. For example, VIM 557 may be configured to receive analog on/off status from key switch 558 and digital input signals from stability control module 563. Whether input data is analog or digital, VIM 557 may be configured to output digital control signals via the CAN Bus 556 to one or more vehicle component controllers or devices, such as one or more vehicle drive systems, including electric actuators 541L, 541R.

Once power from battery 575 is commanded "on" by virtue of the vehicle operator turning the key switch 558 to the "on" position, VIM 557 may be configured to perform power-on functional self-checks, and set the initial conditions for one or more relays and safety sensors. VIM 557 may be configured to receive engine kill requests from any vehicle device or module that is configured to do so. When an engine kill request is received by the VIM 557, the VIM 557 may provide an active low (GND) signal to shut down the vehicle prime mover, such as internal combustion engine 591. In one embodiment, VIM 557 may set to "enable" a Kill Relay configured to provide a kill engine signal to the engine. Simultaneously, the VIM 557 may set to "disable" a Start Relay to avoid prematurely powering a starter motor of the engine before the VIM 557 determines that all required relays are present and functional. Likewise, when the vehicle operator turns the key switch 558 to the off position, the VIM 557 receives a low power signal, which causes the VIM 557 to initiate the step of powering down vehicle systems. VIM 557 may be configured to maintain its own internal power for a short period of time to enable it to perform vehicle power down functions safely.

If the VIM 557 receives no Engine Kill signal or Force to Neutral signal from any vehicle module, then VIM 557 disables the Kill Relay and sets the safety status to "OK." If both of the transaxles 555L, 555R are determined by the VIM 557 to be in a neutral position, then VIM 557 enables the start relay and provides an active high signal to enable power from the battery 575 to be directed to the engine starter motor to start the engine 591, assuming the key switch 558 remains in the "on" position. Apart from mechanical engine failure, the engine 591 will remain running until the key switch 558 is turned to the "off" position or until the VIM 557 enables the Kill Relay and thereafter provides an active low (GND) signal upon determination of a fault condition.

During vehicle operation, control signals are generated and transmitted via CAN Bus 556 in response to operator manipulation of the left and right-side control levers 585L, 585R engaged to the pair of speed control mechanisms 586L, 586R. VIM 557 may be configured to determine system operational status based on the status of the individual modules described above as well as safety interlock sensor data, etc., and control the state of the electric actuators 541L, 541R as appropriate.

VIM 557 may be configured to send a control signal to the electric actuators 541L, 541R to reduce the speed of the vehicle to a predetermined speed, including stopping all vehicle motion, upon receiving or detecting one or more fault conditions, errors or data lying outside of predetermined ranges or limits.

VIM 557 may be configured to receive via CAN Bus 556 and interpret via its own microprocessor: (1) vehicle control signals from any operator input device, such as from a joystick sensor module connected to joystick 599 and speed control mechanisms 586L, 586R connected to left and right-side control levers 585L, 585R, (2) sensor data from one or more sensors, such as component position sensors, and (3) vehicle position, roll, pitch, yaw and motion data from the IMU of stability control module 563. Upon interpreting these data, VIM 557 may directly command any of the vehicle drive systems to respond according to operator desired inputs, as may be modified by vehicle stability control algorithms associated with the implementation of stability control module 563.

Vehicle stability algorithms may optionally be engaged or disengaged, as determined by the user. With stability control disengaged, the speed control mechanisms 586L, 586R send position data associated with the operator-commanded positions of the left and right-side control levers 585L, 585R to the VIM 557. VIM 557 is configured interpret this data and provide a command to drive one or more of the vehicle's drive systems. For example, VIM 557 may receive position data from speed control mechanisms 586L, 586R in the form of an angle or a position value. VIM 557 is configured to interpret the angle or a position value as lying at a particular percentage within, for example, a −100% to 100% total deflection range. If the VIM 557 interprets the data from both speed control mechanisms 586L, 586R as being, for example, 50% forward drive position for each (corresponding to 50% of the total available mechanical forward throw from neutral), then VIM 557 sends a 50% signal to both drive actuators 541L, 541R. In turn, an electronic control module associated with each respective drive actuator 541L, 541R is configured to receive and convert the 50% signal to a voltage, and drives the respective drive actuator 541L, 541R accordingly to obtain a 50% swash displacement across each swash plate of the hydrostatic transaxle. Regardless of whether stability control algorithms are employed, the VIM 577 may nevertheless be configured to receive and interpret position, roll, pitch, yaw and motion data from the IMU of stability control module 563.

With stability control engaged, the IMU of stability control module 563 is configured to output, for each time step, a vector and/or a change in vector associated with the vehicle's position, roll, pitch, yaw and motion. Likewise, the speed control mechanisms 586L, 586R sends position data associated with the operator-commanded positions of the left and right-side control levers 585L, 585R to the VIM 557. VIM 557 is configured to fuse and interpret these data, and for each time step, provide a new command over CAN Bus 556 to one or more of the vehicle's drive systems. VIM 557 continuously receives data from the IMU and continuously updates the command signal to each drive system.

FIG. 11 provides a variation of the embodiment of FIG. 10, where zero turn vehicle 690 does not have, for example, steered front casters but instead uses standard casters 695. Except as noted, other components of vehicle 690 can be substantially identical to those depicted for vehicle 590. By way of example only, transaxles 655L, 655R can be substantially the same as transaxles 555L, 555R previously described.

Zero turn vehicle 690 includes an internal combustion engine 691 driving a belt and pulley system 697 to power a pair of hydrostatic drive assemblies, namely zero turn transaxles 655L, 655R. Each of the zero turn transaxles 655L, 655R may be similar internally to transaxles 355L, 355R and others described herein, and each drives an output axle 679 engaged to a driven wheel 693. Internal combustion engine 691 further drives a mowing deck 698 having mowing blade(s) 698a in a known manner, as disclosed before. Each of the zero turn transaxles 655L, 655R has a respective electric actuator assembly 641L, 641R, which may be similar to those in FIG. 10.

Vehicle 690 includes a control system 670 comprising a plurality of components connected to a CAN Bus network 656 using CAN Bus T-connectors 669 and CAN Bus terminations 668. Battery 675 is used to provide electrical energy for CAN Bus network 656, VIM 657 and related components of vehicle 690. The VIM 657 is directly wired to CAN Bus network 656 and key switch 658 to permit the user to engage and operate the control system. User interface module 659 and diagnostic module 664 (which may include a graphical user interface) are connected to CAN Bus network 656 and used to provide information and feedback to the user for operation and control of vehicle 690. Stability control module 663 (which may include an IMU) also is connected to CAN Bus network 656 to provide proper stability control to vehicle 690.

A pair of speed control mechanisms 686L, 686R are disposed on vehicle 690 and connected to CAN Bus network 656. Control signals to CAN Bus network 656 are generated, in part, in response to the control inputs initiated by an operator manipulating left and right-side control levers 685L, 685R, each engaged to one of a pair of speed and direction controllers 688 including neutral switches 689. Speed and direction controllers 688 may be similar to those in FIG. 10.

Movement of a control lever 685L or 685R in a forward direction produces forward rotation of the output axle 679 and driven wheel 693 of the corresponding left or right-side transaxle 655L, 655R, whereas movement of the control lever in a reverse direction produces reverse rotation of the respective output axle 679 and driven wheel 693. The interaction of operator inputs as translated and modified by the processor of stability control module 663 in response to sensed conditions will be detailed further below.

An optional steering wheel 680 is depicted; it will be understood that vehicle 690 would in most circumstances use either the control lever system or the steering wheel system, but not both. Steering wheel 680 rotates a steering shaft 681 whose rotational position is communicated to CAN Bus network 656 by a steering wheel sensor module 682. Speed and direction commands are communicated by an accelerator sensor module 676 that is operatively engaged to accelerator pedal 672. Vehicle 690 also includes an optional joystick 699 wired to CAN Bus network 656 for control of the vehicle in lieu of using control levers 685L, 685R or steering wheel 680. Joystick 699 may be similar to the joysticks described above, and may be used if needed or desired as an optional control device of vehicle 690, or may replace control levers 685L, 685R (or steering wheel 680) altogether.

Figure 3:
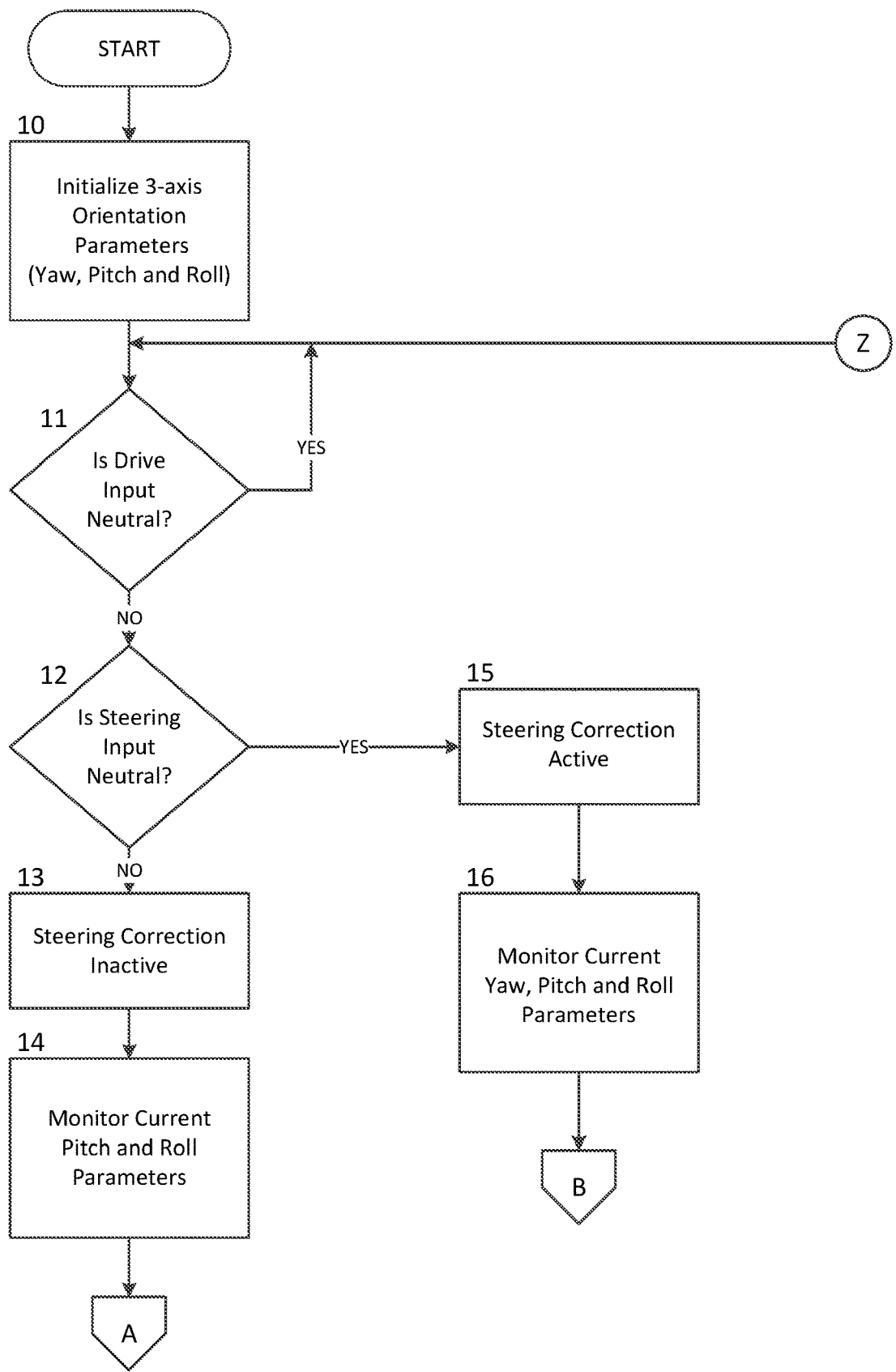
FIG. 3 is a portion of a flow chart of the stability control system disclosed herein, depicting activation of a steering correction feature.

The flowchart depicted in FIGS. 3-8 outlines the behaviors attributable to the stability control system disclosed in the embodiments herein. In a first step 10 upon vehicle startup, as depicted in FIG. 3, the stability control module 160 initializes or zeros the 3-axis orientation parameters provided by its multi-axis gyroscope 160a and stores them for reference purposes relative to previously calibrated values. For simplicity, the 3-axis orientation parameters will be defined with respect to vehicle heading or yaw, vehicle inclination or pitch, and lateral tilt of the vehicle or roll, while fully appreciating that yaw, pitch and roll may typically describe dynamic phenomena. Next, the processor 160c, 260c determines the positional status of the drive input(s), i.e. the position of each control stick 183a, 183b, or that of the accelerator pedal 272, in the forward or reverse direction away from a neutral position (step 11). If the operator controls indicate a neutral intent, no drive commands are relayed to the ground drives 194L, 194R and no stability control features are engaged. If the operator controls indicate a non-neutral intent, the processor then determines the positional status of the steering input(s) (step 12). For vehicle 190, this equates to a differential position between the two control sticks 183a, 183b. The degree to which the two control sticks 183a, 183b can vary from the same forward or reverse position and still permit actuation of a steering correction feature (step 15), i.e. indicate an operator's intent to travel in a straight line or prevent change in the yaw parameter, can be programmed into the stability control module 160 as a correction deadband. For vehicle 290, this determination equates to a programmed deadband pertaining to rotation of steering shaft 281 away from a calibrated neutral steering position, e.g. the center point of a 0-5 V range of potentiometer outputs. If the steering input is non-neutral, i.e. indicative of an operator's intent to turn the vehicle 190, the steering correction feature is not active (step 13). Anytime the steering input falls within the programmed deadband, the steering correction feature of the stability control system is active (step 15). Whether active or inactive, the stability control system monitors the current pitch and roll parameters, and in the case of intended straight line tracking, the yaw parameter as well (steps 14 and 16 respectively).

Figure 4:
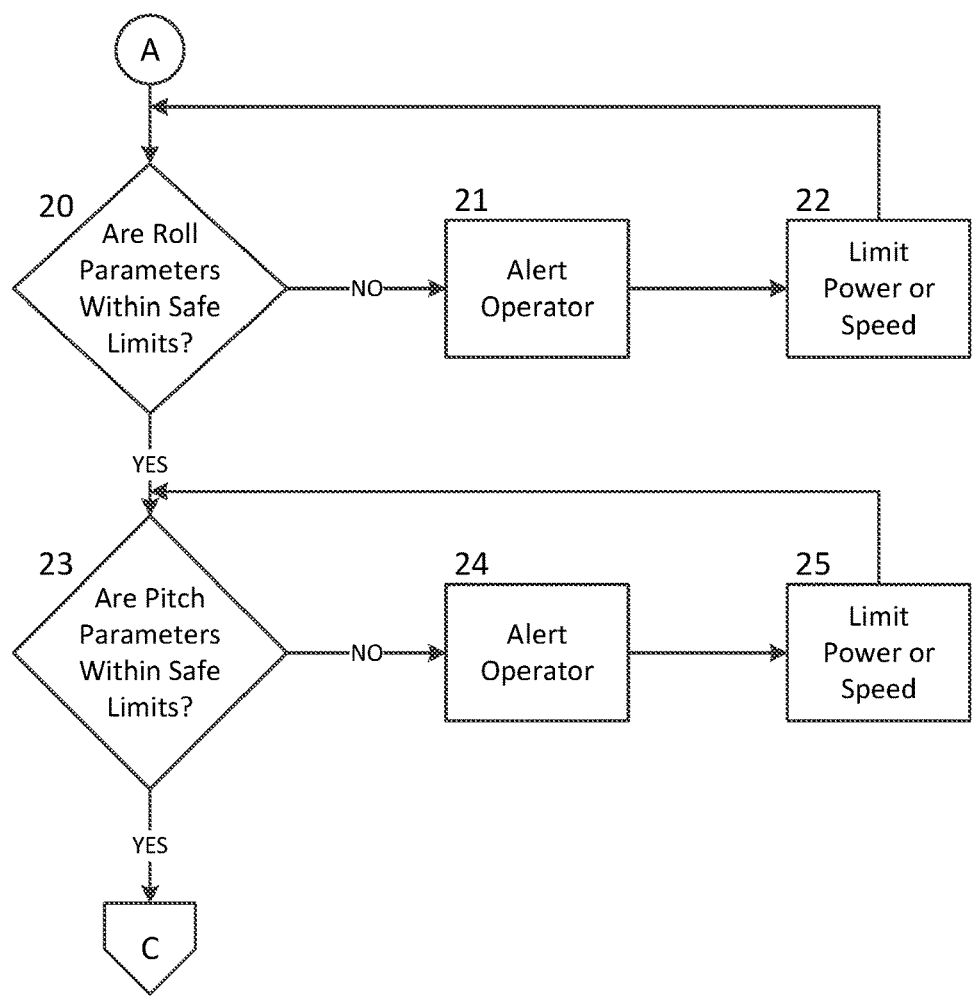
FIG. 4 is a portion of the flow chart depicting a rollover protection feature available when the steering correction feature is not active.
Figure 5:
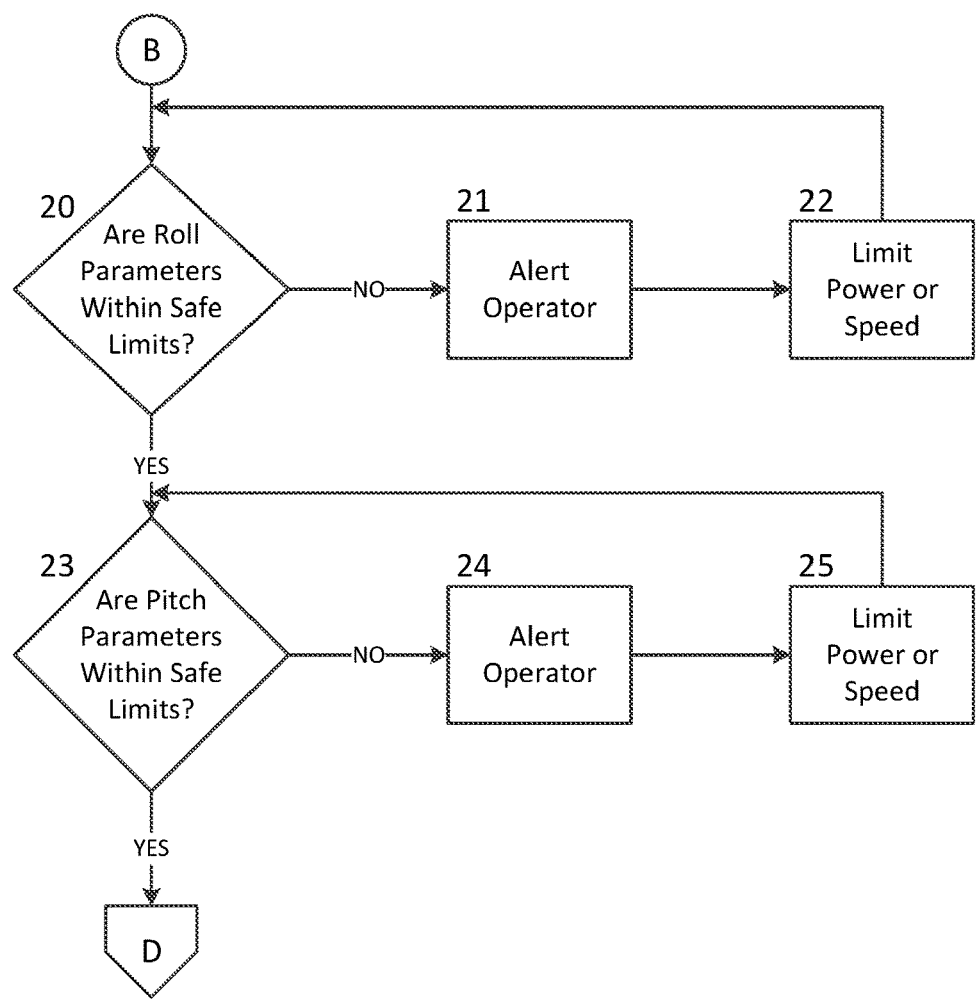
FIG. 5 is a portion of the flow chart depicting the rollover protection feature of FIG. 4 as accessed when the steering correction feature is active.

FIGS. 4 and 5 indicate that, regardless of the status of the steering correction feature, i.e. whether the vehicle 190 is turning or being steered in a straight line, the roll and pitch parameters are continually being compared to the initialized values of each (steps 20 and 23 respectively). In the event the current roll or pitch parameter deviates from the initial values beyond preprogrammed thresholds related to vehicle design such as weight, wheelbase, center of gravity, and the like, an audible or visual warning mechanism 174 is triggered (steps 21 and 24 respectively) to alert the operator to a potentially hazardous operating condition. In addition, the power supplied to the ground drives 194L, 194R or the maximum vehicle speed can be limited by commands supplied by the stability control module 160 to the respective motor controllers 162L, 162R (steps 22 and 25 respectively). This feature of the stability control system provides the operator of the vehicle with rollover protection. While FIGS. 4 and 5 indicate sequential evaluation of roll and pitch parameters, this is representational only for ease of understanding, and it is understood that with respect to microprocessor speeds, this review effectively occurs simultaneously and could be represented in parallel.

Figure 6:
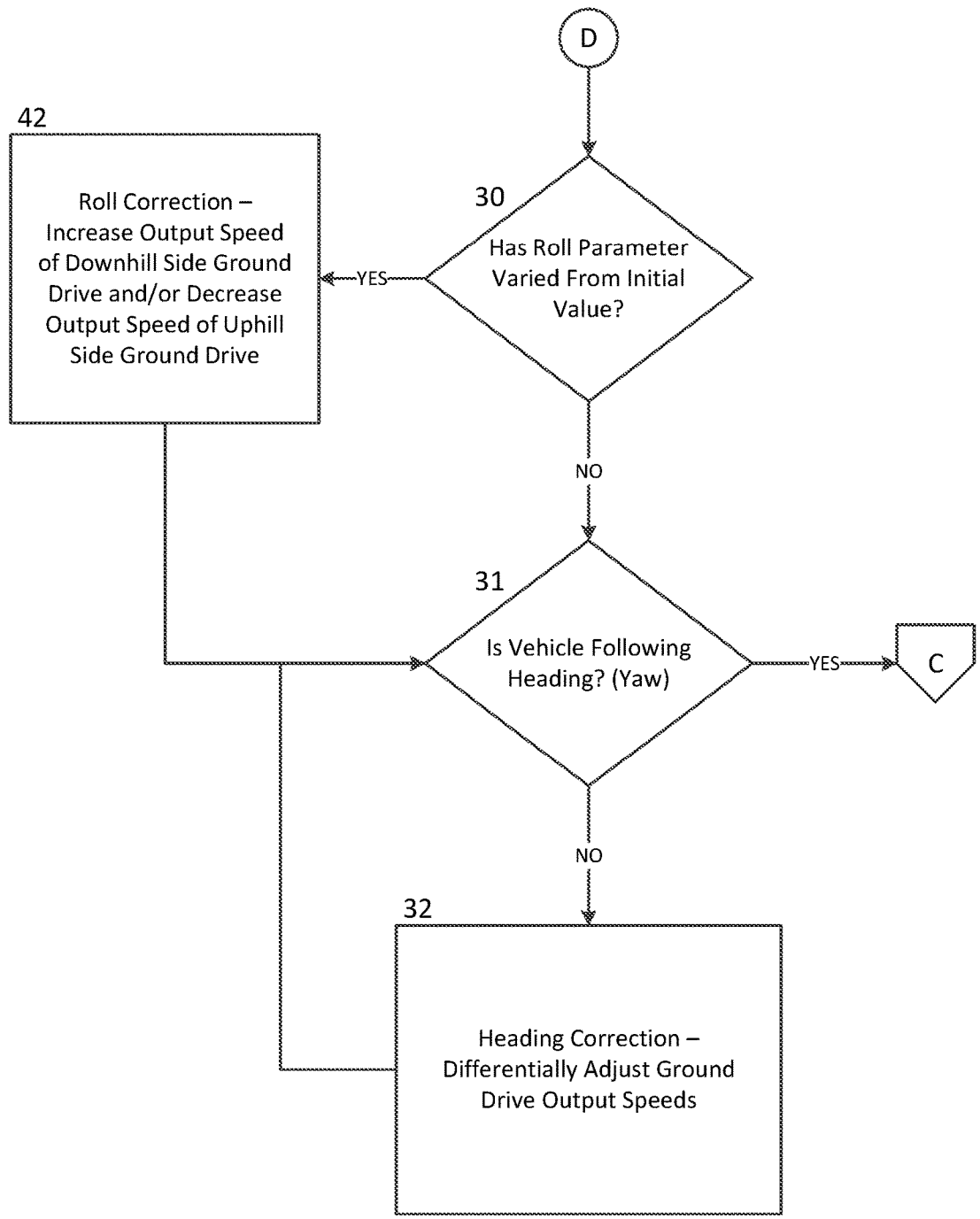
FIG. 6 is a portion of the flow chart depicting a straight line tracking feature.

FIG. 6 outlines the straight line tracking feature of the stability control system as applied to a vehicle 190 on level ground and on a hillside, respectively. Zero turn vehicles tracking across a hillside want to nose downhill under the effects of gravity. An operator of such a vehicle tends to differentially steer the vehicle to maintain a straight track, i.e. provide a greater power input to the downhill ground drive or a lesser power input to the uphill ground drive requiring additional operator attention and potentially increasing operator fatigue during operation of the vehicle 190. In step 30, comparison of the current roll parameter to its initial value determines the ground topography. In step 31, regardless of level ground or hillside location, the vehicle heading or instantaneous yaw parameter is continually checked against that value captured in step 16 upon activation of the steering correction feature. In the event of deviation of the vehicle heading outside a preprogrammed limit, the stability control system will correct the vehicle heading to the desired track by means of differential steering of the left and right-side ground drives 194L, 194R on level ground (step 32 requiring yaw parameters only) and further requiring an understanding of uphill and downhill side positioning of the respective ground drives to correct vehicle heading on sidehills (step 42 requiring yaw parameters for tracking and roll parameters for specifying the relative uphill and downhill positions). In either case, the 3-axis accelerometer can provide the processor of the stability control module 160 with the rate of deviation from the target heading, whereby the steering correction feature can more aggressively return a wayward vehicle back to the target heading. These rates and reactions can be preprogrammed into the processor.

Figure 7:
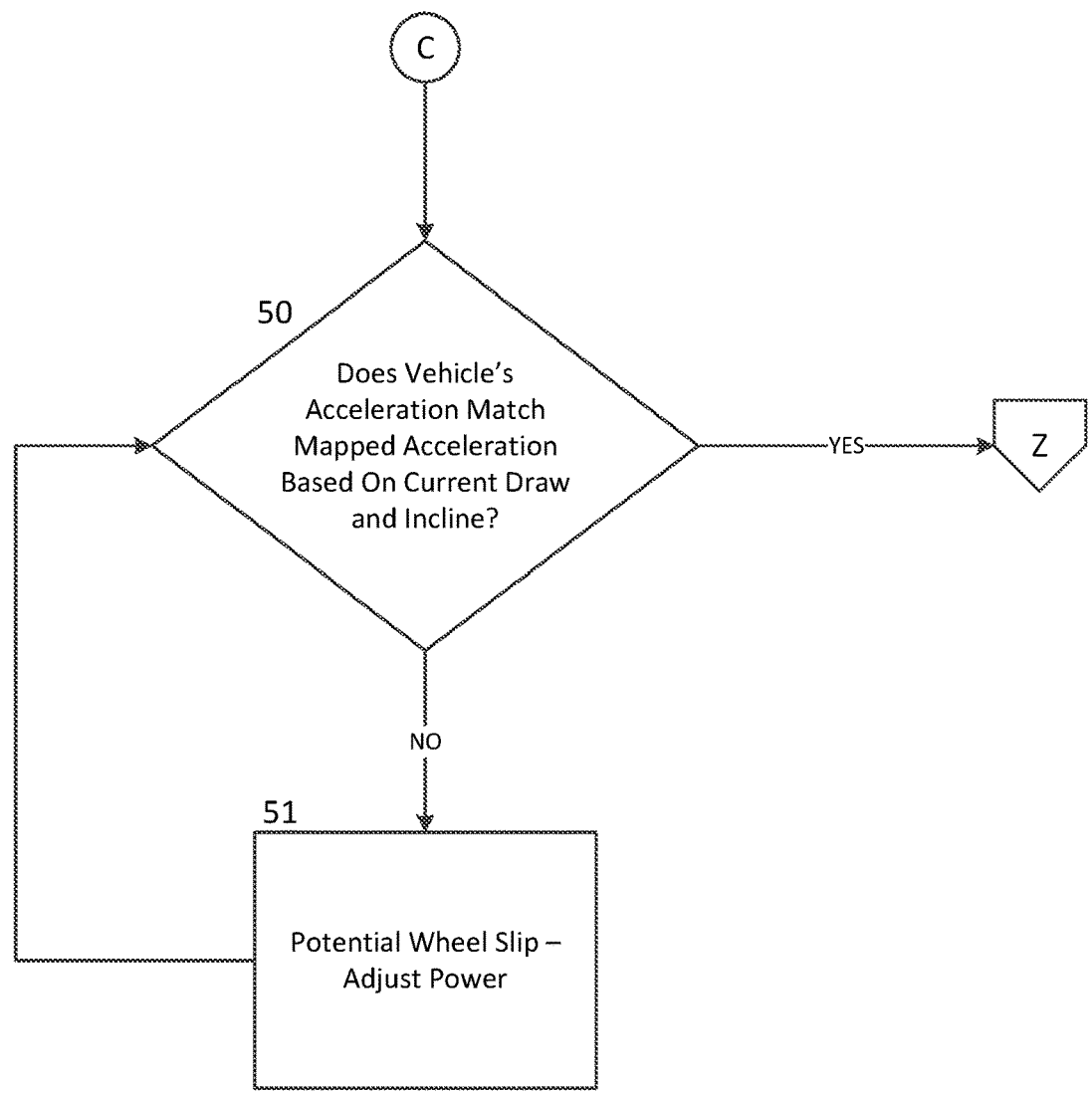
FIG. 7 is a portion of the flow chart depicting a wheel slip and traction control feature.

FIG. 7 outlines a traction control feature of the stability control system in which the vehicle's actual acceleration, whether travelling in a straight line or turning, is compared to a map of expected acceleration stored in the stability control module 160. This map is based on expected vehicle acceleration for a given indicia of acceleration and incline or pitch, as shown at step 50. For an electric or hybrid vehicle, this indicia of acceleration would be the current draw, whereas in a vehicle using hydraulic drive mechanisms and, e.g., actuators controlling the drive output, the indicia of acceleration would be the variation of the steering mechanism from a neutral location (e.g., with lap bars, a measurement of rate of change in the position of the lap bars and/or the variance in the position of the two lap bars). Deviation from the expected outcome demonstrating unintended deceleration can be indicative of wheel slip. Correction of the condition generally requires a (downward) adjustment of power to the ground drives 194L, 194R, until an expected acceleration is achieved, indicative of the resumption of acceptable traction.

Figure 12:
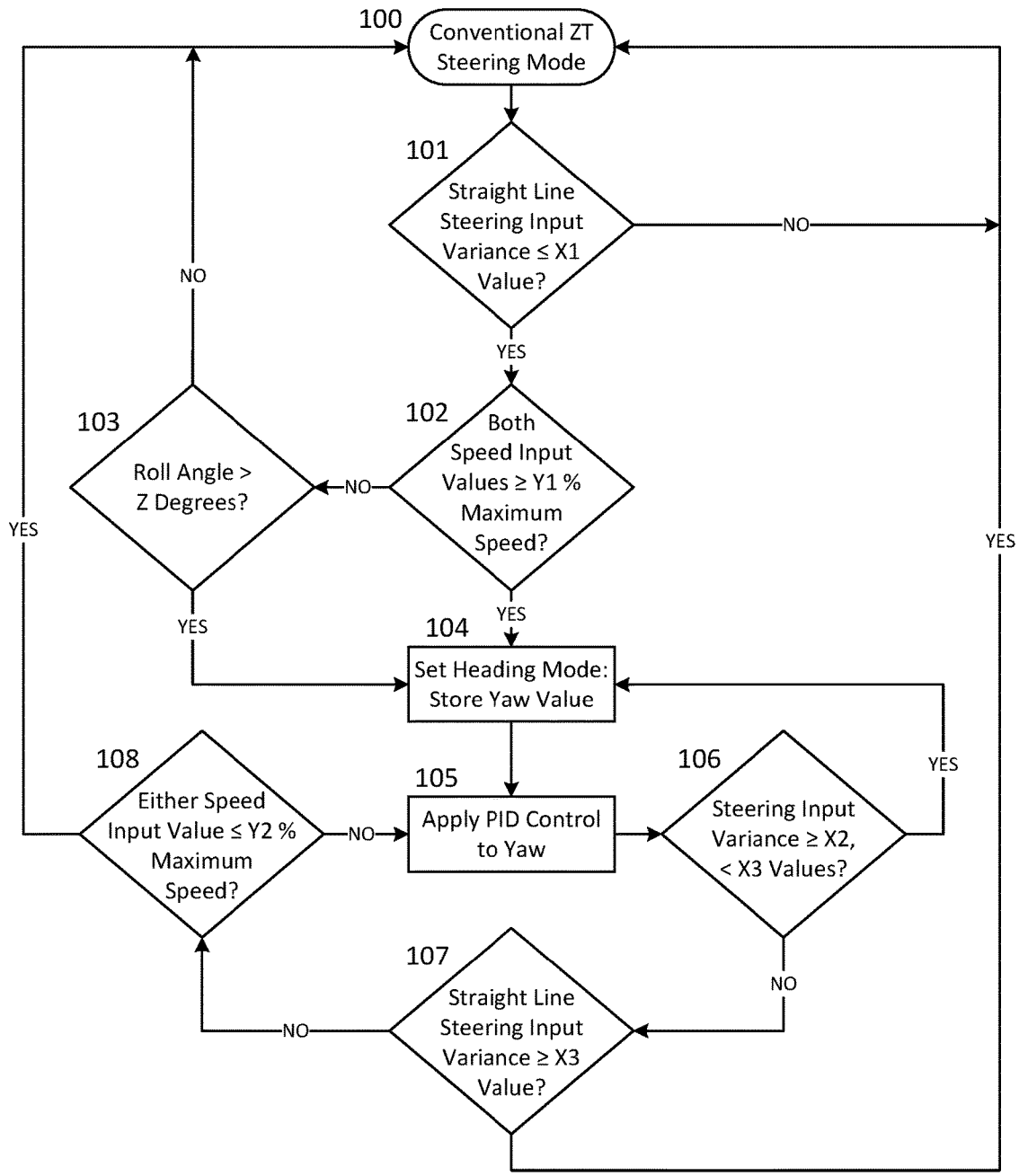
FIG. 12 is a flow chart depicting a steering correction algorithm in accordance with a further embodiment of the present disclosure.

An alternative embodiment of an automatic vehicle steering correction algorithm is shown in FIG. 12. The vehicle is in a "Conventional ZT Steering Mode" 100 and responds to drive and steering input signals accordingly unless certain conditions are met. In a first condition 101, vehicle control levers, such as control sticks 183*a*, 183*b* shown in FIG. 1 or similar levers or lap bars as shown in other figures herein, are positioned near each other within a steering neutral band that implies the operator wishes the vehicle to track in a straight line. The width of this steering neutral band (or maximum amount of "Steering Input Variance" allowed to satisfy this first condition 101) is defined by a programmed value X1. To satisfy a second condition 102, both vehicle control levers must be moved away from a drive neutral position. The minimum degree to which the control levers must be moved away from the drive neutral position in order to satisfy the second condition 102 is defined by a programmed value Y1. The amount of movement required to meet second condition 102 can be expressed as a percentage of the control levers movement range (or percent of maximum drive speed). If both of these conditions 101, 102 are met, or if the first condition 101 is met and a third condition 103 is met, wherein the vehicle is positioned on a side slope exceeding a specified number of degrees as represented by the programmed variable Z, then the vehicle changes to a "Set Heading Mode" 104 in which the current IMU yaw reading is "grabbed" and stored. This stored yaw value becomes the desired heading of the vehicle. The vehicle then enters a closed loop steering correction mode (steps 105-108) in which the signals generated by movement of the control levers are modulated (in step 105) using a classic feedforward PID (Proportional-Integral-Derivative) control scheme. This PID control scheme compares the latest actual IMU yaw reading to the saved heading (yaw value stored in step 104). If the control levers are spread only slightly, i.e. have minimal difference in displacement, (step 106) while in this mode the vehicle will switch back to the "Set Heading Mode" 104 to grab and store a new heading (yaw value) and then reenter the closed loop mode. If the control lever spread becomes great enough, then the vehicle will exit the closed loop mode and go back to normal operations (Conventional ZT Steering Mode 100). In other words, a slight spread of the control levers while in the closed loop mode is interpreted by the steering correction algorithm as indicative of a desire by the vehicle operator to maintain straight line travel and is expressed as a "Steering Input Variance" (step 106) having a range comprising a programmed lower value X2 and an upper programmed exit value X3. In step 107, if the programmed "Steering Input Variance" value X3 is met or exceeded, the vehicle will exit the closed loop mode and go back to normal operations (Conventional ZT Steering Mode 100). In step 108, if either control lever has been moved to a position at or below a programmed value Y2 (a percentage of the control levers movement range or percent of maximum drive speed), the vehicle will exit the closed loop mode and go back to normal operations (Conventional ZT Steering Mode 100).

While specific embodiments of the invention have been described in detail, it will be appreciated by those skilled in the art that various modifications and alternatives to those details could be developed in light of the overall teachings of the disclosure. One of ordinary skill in the art will appreciate that various features described or incorporated by reference herein may be combined into a single embodiment regardless of whether the features are shown in a single drawing figure. Accordingly, the particular arrangements disclosed are meant to be illustrative only and not limiting as to the scope of the invention which is to be given the full breadth of the appended claims and any equivalent thereof.

What is claimed is:

1. A drive and control system for use on a vehicle having a prime mover, the drive and control system comprising:
   a first hydraulic ground drive engaged to and independently driving a first driven wheel, and a first electric actuator engaged to the first hydraulic ground drive to control the output thereof;
   a second hydraulic ground drive engaged to and independently driving a second driven wheel, and a second electric actuator engaged to the second hydraulic ground drive to control the output thereof;
   an operator mechanism disposed on the vehicle and configured to generate a drive signal and a steering signal, wherein:
      the drive signal corresponds to a neutral drive position of the operator mechanism or to one of a plurality of non-neutral drive positions of the operator mechanism; and
      the steering signal corresponds to a neutral steering position of the operator mechanism or to one of a plurality of non-neutral steering positions of the operator mechanism;

a plurality of sensors disposed on the vehicle and capable of generating sensor signals corresponding to sensed roll parameters, sensed pitch parameters and sensed yaw parameters; and a stability control module comprising a processor connected to the operator mechanism for receiving the drive signal and the steering signal, the stability control module being connected to and capable of providing output signals to the pair of electric actuators;

wherein the processor is configured to:
(a) load an initial roll parameter, an initial pitch parameter, and an initial yaw parameter;
(b) if the drive signal corresponds to one of the non-neutral drive positions, and if the steering signal corresponds to the neutral steering position, activate a steering correction feature;
(c) if the drive signal corresponds to one of the non-neutral drive positions, perform a roll comparison by comparing at least one of the sensed roll parameters to the initial roll parameter and, in response to a first outcome of the roll comparison, limit power supplied to the pair of hydraulic ground drives, enforce a first predetermined maximum vehicle speed, or provide an audible or visual warning; and
(d) if the drive signal corresponds to one of the non-neutral drive positions, perform a pitch comparison by comparing at least one of the sensed pitch parameters to the initial pitch parameter and, in response to a first outcome of the pitch comparison, limit power supplied to the pair of hydraulic ground drives, enforce a second predetermined maximum vehicle speed or provide an audible or visual warning.

2. The drive and control system of claim 1, wherein the operator mechanism comprises a pair of control sticks, each having a plurality of operative positions, wherein the drive signal and the steering signal are generated based on the operative positions of the pair of control sticks.

3. The drive and control system of claim 2, further comprising a first position sensor communicating the operative position of one of the pair of control sticks to the processor and a second position sensor communicating the operative position of the other of the pair of control sticks to the processor.

4. The drive and control system of claim 3, wherein the processor determines if the drive signal corresponds to the neutral drive position by evaluating the operative position of each control stick and determines if the steering signal corresponds to the neutral steering position by evaluating a differential between the operative positions of the pair of control sticks.

5. The drive and control system of claim 4, wherein the processor may be programmed to select the magnitude of the differential position between the pair of control sticks at which the steering signal corresponds to the neutral steering position.

6. The drive and control system of claim 1, wherein the operator mechanism comprises an accelerator pedal and a steering wheel, wherein the processor determines if the drive signal corresponds to the neutral drive position of the operator mechanism by evaluating the operative position of the accelerator pedal and determines if the steering signal corresponds to the neutral steering position of the operator mechanism by evaluating the rotational position of the steering wheel.

7. The drive and control system of claim 1, wherein the processor is configured to, in response to activation of the steering correction feature:

perform a first heading correction that differentially steers the pair of driven wheels based on one or more of the sensed yaw parameters, but not based on the sensed roll parameters; and
perform a second heading correction that differentially steers the pair of driven wheels based on one or more of the sensed yaw parameters and based on one or more of the sensed roll parameters.

8. The drive and control system of claim 1, wherein the roll comparison compares a difference between the sensed roll parameters and the initial roll parameter to a first preprogrammed threshold related to at least one of the following vehicle design characteristics: weight of the vehicle, wheelbase of the vehicle or the center of gravity of the vehicle.

9. The drive and control system of claim 1, wherein the pitch comparison compares a difference between the sensed pitch parameters and the initial pitch parameter to a second preprogrammed threshold related to at least one of the following vehicle design characteristics: weight of the vehicle, wheelbase of the vehicle or the center of gravity of the vehicle.

10. The drive and control system of claim 1, wherein the processor is configured not to activate the steering correction feature if the steering signal corresponds to one of the plurality of non-neutral steering positions.

11. The drive and control system of claim 1, wherein the processor is configured to:
load an expected acceleration and determine an actual acceleration;
generate an acceleration comparison by comparing the expected acceleration to the actual acceleration; and,
in response to a first outcome of the acceleration comparison, decrease power to at least one of the pair of hydraulic ground drives.

12. The drive and control system of claim 11, wherein the processor is configured to load the expected acceleration based on a measured current draw and at least one of the sensed pitch parameters.

13. The drive and control system of claim 12, further comprising a generator connected to the pair of hydraulic ground drives, and the measured current draw is an electric current supplied from the generator to one or both of the pair of hydraulic ground drives.

14. The drive and control system of claim 11, wherein, in response to a second outcome of the acceleration comparison, wherein the second outcome comprises detecting that the expected acceleration matches the actual acceleration, the processor is configured to maintain or increase power to the at least one of the pair of hydraulic ground drives.

15. The drive and control system of claim 11, wherein the processor is configured to compare the actual acceleration to the expected acceleration after performing the roll comparison and the pitch comparison.

16. The drive and control system of claim 1, wherein the processor may be programmed to include a steering deadband where the steering signal corresponds to the neutral steering position when the operator mechanism is in a plurality of steering positions.

17. The drive and control system of claim 1, wherein the plurality of sensors comprises a multi-axis gyroscope and a multi-axis accelerometer.

18. The drive and control system of claim 17, wherein the gyroscope and the accelerometer are integral with the stability control module.

19. A drive and control system for use on a vehicle having one or more driven wheels, the drive and control system comprising:
- a plurality of operator inputs, comprising:
  - an operator drive input having a neutral drive position and a plurality of non-neutral drive positions; and
  - an operator steering input having a neutral steering position and a plurality of non-neutral steering positions;
- at least one hydraulic ground drive engaged to and driving at least one driven wheel;
- a plurality of sensors disposed on the vehicle and capable of generating sensor signals corresponding to sensed roll parameters, sensed pitch parameters, and sensed yaw parameters;
- a stability control module comprising a processor connected to the plurality of operator inputs, the stability control module being connected to and capable of providing output signals to the at least one hydraulic ground drive;
- wherein the processor is configured to:
  - (a) determine whether the operator drive input is in one of the non-neutral drive positions;
  - (b) determine whether the operator steering input is in the neutral steering position;
  - (c) if the operator drive input is in one of the non-neutral drive positions, and if the operator steering input is in the neutral steering position, activate a steering correction feature;
  - (d) if the operator drive input is in one of the non-neutral drive positions, perform a roll comparison by comparing at least one of the sensed roll parameters to an initial roll parameter and, in response to a first outcome of the roll comparison, limit power supplied to the at least one hydraulic ground drive, enforce a first predetermined maximum vehicle speed or provide an audible or visual warning; and
  - (e) if the operator drive input is in one of the non-neutral drive positions, provide a pitch comparison by comparing at least one of the sensed pitch parameters to an initial pitch parameter and, in response to a first outcome of the pitch comparison, limit power supplied to the at least one hydraulic ground drive, enforce a second predetermined maximum vehicle speed or provide an audible or visual warning.

20. A method of operating a vehicle, the vehicle comprising:
- a pair of driven wheels, and a drive and control system comprising:
  - a plurality of operator inputs, comprising an operator drive input having a neutral drive position and a plurality of non-neutral drive positions and an operator steering input having a neutral steering position and a plurality of non-neutral steering positions;
  - a pair of hydraulic ground drives, each hydraulic ground drive being engaged to and driving at least one of the pair of driven wheels;
  - a plurality of sensors disposed on the vehicle and capable of generating sensor signals corresponding to sensed roll parameters, sensed pitch parameters, and sensed yaw parameters; and
  - a stability control module comprising a processor connected to the plurality of operator inputs, the stability control module being connected to and capable of providing output signals to the pair of hydraulic ground drives;
- the method comprising, via the processor:
  - (a) determining whether the operator drive input is in one of the non-neutral drive positions;
  - (b) determining whether the operator steering input is in the neutral steering position;
  - (c) if the operator steering input is in the neutral steering position, activating a steering correction feature;
  - (d) if the operator drive input is in one of the non-neutral drive positions, providing a roll comparison by comparing at least one of the sensed roll parameters to an initial roll parameter and, in response to a first outcome of the roll comparison, limiting power supplied to the pair of hydraulic ground drives or enforcing a first predetermined maximum vehicle speed or providing an audible or visual warning; and
  - (e) if the operator drive input is in one of the non-neutral drive positions, providing a pitch comparison by comparing at least one of the sensed pitch parameters to an initial pitch parameter and, in response to a first outcome of the pitch comparison, limiting power supplied to the pair of hydraulic ground drives or enforcing a second predetermined maximum vehicle speed or providing an audible or visual warning.

21. The method of claim 20, comprising, in response to activation of the steering correction feature, performing a first heading correction that differentially steers the pair of driven wheels based on one or more of the sensed yaw parameters, but not based on the sensed roll parameters.

22. A drive and control system for use on a vehicle having a prime mover, a pair of driven wheels, and a pair of hydraulic ground drives, each hydraulic ground drive being engaged to and independently driving one of the pair of driven wheels to provide zero turn capability to the vehicle, the drive and control system comprising:
- an operator mechanism comprising a pair of control sticks, each having a neutral position and a plurality of operative positions, wherein a separate drive signal is generated by each control stick based on the operative position of the respective control stick;
  - each drive signal corresponds to a neutral drive position of the corresponding control stick or to one of a plurality of non-neutral drive positions of the corresponding control stick; and
- a first position sensor communicating the operative position of one of the pair of control sticks to a first processor and a second position sensor communicating the operative position of the other of the pair of control sticks to the first processor;
- wherein each of the pair of control sticks generates a speed input value when in one of the plurality of non-neutral drive positions, the speed input value corresponding to a desired speed of the driven wheel corresponding to the respective control stick;
- a plurality of sensors disposed on the vehicle and capable of generating sensor signals corresponding to sensed roll parameters, sensed pitch parameters and sensed yaw parameters; and
- a pair of electric actuators, each of the pair of electric actuators engaged to one of the pair of hydraulic ground drives to control the output thereof;
- a stability control module comprising a second processor connected to the operator mechanism for receiving each drive signal and a separate steering signal generated by each control stick based on the operative position of the respective control stick, the stability control module being connected to and capable of providing output signals to the pair of electric actuators;

wherein the second processor is configured to:
- (a) determine if the steering signal of each control stick corresponds to the neutral drive position or one of the plurality of non-neutral drive positions by evaluating the operative positions of the pair of control sticks;
- (b) measure a differential between the operative positions of the pair of control sticks;
- (b) if the differential between the operative positions of the pair of control sticks is greater than a first predetermined amount, permit the vehicle to operate in a normal zero turn mode; and
- (c) if the differential between the operative position of the pair of control sticks is less than the first predetermined amount, and if the steering signal of each control stick exceeds a first predetermined value, then record and store a yaw value of the vehicle as the desired heading of the vehicle and modulate the steering signal of each control stick using a proportional integral derivative control scheme.

* * * * *